(12) United States Patent
Pirozzi et al.

(10) Patent No.: US 7,714,571 B2
(45) Date of Patent: May 11, 2010

(54) METHOD AND DEVICE FOR ESTIMATING VARIATIONS OF THE POSITION OF THE ROTOR OF AN ELECTRIC MOTOR

(75) Inventors: Francesco Pirozzi, Naples (IT); Maurizio Di Meglio, Casoria (IT); Stefano Baratto, Naples (IT)

(73) Assignee: STMicroelectronics S.R.L., Agrate Brianza (MI) (IT)

( * ) Notice: Subject to any disclaimer, the term of this patent is extended or adjusted under 35 U.S.C. 154(b) by 475 days.

(21) Appl. No.: 11/689,736

(22) Filed: Mar. 22, 2007

(65) Prior Publication Data

US 2007/0241741 A1 Oct. 18, 2007

(30) Foreign Application Priority Data

Mar. 23, 2006 (EP) ................................. 06425199

(51) Int. Cl.
*G01B 7/30* (2006.01)
*G01P 3/42* (2006.01)
*G01F 15/06* (2006.01)

(52) U.S. Cl. .................. 324/207.25; 324/160; 324/173; 377/19

(58) Field of Classification Search ............ 324/207.25, 324/166, 173; 377/19, 17
See application file for complete search history.

(56) References Cited

U.S. PATENT DOCUMENTS

| 4,629,949 A | 12/1986 | Senso | 318/257 |
| 5,138,640 A | 8/1992 | Fleck et al. | 377/39 |
| 2004/0012507 A1 | 1/2004 | Villaret et al. | 341/11 |

FOREIGN PATENT DOCUMENTS

EP 0495352 7/1992

OTHER PUBLICATIONS

An Introduction to Sensorless Brushless DC Motor Drive Applications with the ST72141, STMicroelectronics Application Note AN1130, 29 pages, 2000.

(Continued)

*Primary Examiner*—Reena Aurora
(74) *Attorney, Agent, or Firm*—Lisa K. Jorgenson; Allen, Dyer, Doppelt, Milbrath & Gilchrist, P.A.

(57) ABSTRACT

A method estimates variations of position of the rotor of a motor having a plurality of uniformly spaced sensors that generate a position pulse at every rotation by a pre-established angle of the rotor. The method may include generating a first clock signal at a first frequency, generating a second clock signal at a second frequency multiple than the first frequency by a first factor, in each interval between two consecutive position pulses, counting the number of pulses of the first clock signal comprised in the interval, counting the number of pulses of the second clock signal comprised in the interval. The method may also include that each time the number of counted pulses of the second clock reaches the number of pulses of the first clock counted in an interval that precedes the currently considered interval, signaling that the position of the rotor has varied of an angle equal to the ratio between the pre-established angle and the factor.

17 Claims, 23 Drawing Sheets

OTHER PUBLICATIONS

DMOS Driver for Three-Phase Brushless DC Moto, STMicroelectronics Datasheet L6235, 25 pages, Sep. 2003.

V. Marano, L6235 Three Phase Brushless Motor Driver, STMicroelectronics Application Note AN1625, 39 pages, Oct. 2003.

8-bit MCU with Nested Interrupts, Flash, 10-bit ADC, Brushless Motor Control, Five Timers, SPI, LINSCI, STMicroelectronics Datasheet ST7MC1/ST7MC2, 303 pages, Nov. 2005.

Closed Loop Speed Controller for 3-Phase Brushless DC Motor MP-3T Package, International Rectifier Datasheet OMC506, 7 pages, Nov. 2003.

Ting-Yu Chang et al., A Hall Sensor Based IPM Traction Motor Drive, IEEE 0-7803-7369-3/02/$17, pp. 840-843, 2002.

J.X. Sheng, Z.Q. Zhu, D. Howe, PM Brushless Drives with Low-Cost and Low-Resolution Position Sensor, IEEE, Power Electronics and Motion Control Conference, 2004. IPEMC 2004. The 4th International, vol. 2, Issue, Aug. 14-16, 2004 pp. 1033-1038 vol. 2.

ST7MC PMAC Sine Wave Control Software Library, STMicroelectronics, Application Note, AN1947/1204 Rev.1.0., 35 pages, 2004.

Jiri Riba, Sine Voltage Powered 3-Phase Permanent Magnet Motor with Hall sensor, Freescale Semiconductor Inc., AN2357, Nov. 2002.

METHOD AND DEVICE FOR ESTIMATING VARIATIONS OF THE POSITION OF THE ROTOR OF AN ELECTRIC MOTOR

FIELD OF THE INVENTION

This invention relates to techniques for controlling electric motors and more particularly to a method for estimating the position and the speed of an electric motor and a related hardware estimator implementing the method.

BACKGROUND OF THE INVENTION

Electric motors are frequently used in the automotive field not only in electric cars but also as actuators in servocontrol systems for driving pumps, compressors and the like. Many functional devices of a car are motorized for enhanced performance, comfort and safety of the driver and of passengers, such as the fuel pump, the over-modulation compressor, the transmission gears, the power steering, safety belts, windows and so forth.

Some of these functional devices were servo-assisted by exploiting the motor torque available on the shaft of the thermal engine of the car. This implies inefficiencies in using part of the mechanical energy obtained by burning fuel for powering these devices. Lately the use of electric motors, that convert electric energy into mechanical energy, has become more and more the preferred choice. Permanent magnet brushless motors are often preferred in these automotive applications. The characteristics of permanent magnet brushless motors are particularly suitable for automotive applications: they are relatively light, have a high power density, a small size and are very reliable, though they are relatively expensive (due to the costs of the magnets used for fabricating the rotor), more difficult to control than a traditional DC electrical machine, and need more or less precise angular position sensors, depending on the brushless motor and the control strategy.

In particular, when implementing control strategies that contemplate a sinusoidal modulation of the PWM (Pulse Width Modulation), whether DC (trapezoidal induced back electromotive force) or AC (sinusoidal induced back electromotive force), it may be necessary to use sensors of the angular position, such as (incremental or absolute) encoders and resolvers that are relatively expensive (encoders) and use complicated sensing techniques (resolvers). In applications where it may not be necessary to gather information about the angular position of the rotor with a high precision (electrohydraulic actuators, control systems with low dynamical performances requirements etc.) but where robustness, low cost and encumbrance are of paramount importance, the use of Hall sensors may be convenient.

A Hall sensor may be viewed as a thin foil of conducting material in which a current I flows in presence of an external magnetic field orthogonal to current lines in the foil, as depicted in FIG. 1. When the applied magnetic field is null, the current distribution over the foil is uniform and between the output terminals there is not any voltage. If, as shown in FIG. 2, a non null magnetic field is applied orthogonally to the surface, a certain voltage $V_H$ may be measured between the output terminals because of the effect of Lorentz force on the electrons.

This force alters the current distribution and the generated voltage $V_H$ is given by the following equation:

$$V_H = \frac{1}{n \cdot q} \frac{I \cdot B}{b} \quad (1)$$

wherein
I=applied current;
B magnetic induction;
q=electron charge;
n=carrier density; and
b=thickness of the foil along the direction of the magnetic induction B.

Commonly, as depicted in FIG. 3, brushless motors should have three or more Hall sensors. The sensors may be mounted at an extremity of the drive shaft, directly in the motor or around a magnetic ring mounted on the drive shaft. The system is realized such that, when a south pole of the permanent magnet rotor pass over the surface of the sensor, the latter generates a voltage pulse, that switches low when a north pole passes over the surface of the sensor. For simplicity sake, hereinafter reference will be made to the case in which only three Hall sensors are installed in the motor uniformly spaced of a same rotation angle of the rotor, but what will be stated holds similarly if more or less than three Hall sensors are installed.

FIG. 4 depicts sample waveforms of voltage signals generated by Hall sensors for a PMSM (Permanent Magnet Synchronous Motor) with two polar couples. Of course, the number of polar couples influences the number of switchings for each complete mechanical revolution of the rotor. For each couple of poles, there are six switchings of the Hall sensors, two for each phase; this implies that for a motor with two polar couples, there will be 6×2 switchings.

In correspondence of each leading or trailing edge of the pulse signals generated by the Hall sensors, it is possible to establish with precision that the rotor has rotated by 60 electrical degrees, but the signals generated by Hall sensors do not indicate precisely which is the position of the rotor between two successive switching edges. In literature, various ways of obtaining information on the angular position of the rotor of a brushless motor by using Hall sensors are described.

In the so-called step-mode control, the turn on and turn off instant of the components of an inverter are determined by the occurrence of the high pulse in the signal generated by the Hall sensors of FIG. 5. This method is simple to implement, but it has the following drawbacks: low resolution in the application of control vectors that cause surges of "cogging" torques; generation of noise at audible frequencies; and generation of EMI.

This control technique may be easily implemented with a hardware system. An example is given by the integrated circuit L6235, manufactured by STMicroelectronics, see *DMOS driver for Three-Phase Brushless DC Moto and STMicroelectronics Datasheet L6235*, September 2003 V. Marano, L6235 *Three Phase Brushless Motor Driver*, STMicroelectronics Application Note AN1625, October 2003. It includes a three-phase DMOS driver completely integrated in Multipower BCD technology and the logic circuit for controlling in step-mode the inverter integrated in the chip.

Moreover, STMicroelectronics has included in microcontrollers devices of the ST7MC family, 8-bit MCU with Nested Interrupts, Flash, 10-bit ADC, Brushless Motor Control, Five Timers, SPI, LINSCI, STMicroelectronics Datasheet ST7MC1/ST7MC2, November 2005, a dedicated peripheral for implementing a step-mode control, using Hall sensors. International Rectifier produces similar devices, called OMC506, Closed Loop Speed Controller for 3-Phase Brushless DC Motor MP-3T Packag, International Rectifier Datasheet OMC506, November 2003.

Another approach consists in estimating the electrical angular position and the mechanical angular speed by means of various reconstruction and interpolation algorithms starting from signals coming from Hall sensors. In Ting-Yu Chang et al., A Hall Sensor Based IPM Traction Motor Drive, IEEE 0-7803-7369-3/02/$17, 2002, a high frequency train of pulses phase-locked by a PLL is generated from Hall sensor signals. With this technique it is possible to increase the angular resolution up to 1.25 electrical degrees. No provision for managing the rotation speed in both senses nor any method for estimating the angular speed are proposed in the article.

The article J. X. Sheng, Z. Q. Zhu, D. Howe, PM Brushless Drives with Low-Cost and Low-Resolution Position Sensor, IEEE, discloses a technique for estimating the angular speed starting from signals coming from Hall sensors (every 60 electrical degrees). In order to take into account the fact that the sensors are never perfectly symmetrically installed on the motor, the calculation is not carried out on each single pulse of the signal coming from Hall sensors, but on a whole cycle and for each sensor such to have a mean value of such a speed jitter filtered information. The position is estimated by time integrating the speed using as initial condition the information about the position provided by the Hall sensors, each 60 electrical degrees.

The article ST7MC PMAC Sine Wave Control Software Library, STMicroelectronics, Application Note, AN1947/1204 Rev.1.0 discloses a technique that exploits the synchronism, typical of brushless motors, that consists in synchronizing the excitation with the position and the instantaneous frequency of the rotor. The most straightforward mode for obtaining this result consists in continuously measuring the absolute angular position of the rotor and its rotational speed, such that the excitation may be managed on the single phases of the motor with an exact synchronism with the motion of the rotor.

This is known as self-synchronization technique and uses as a feedback signal, a signal representative of the angular position of the rotor to prevent loss of synchronization. In this case, the Hall sensors are used for measuring the angular position of the rotor starting from the direction of the magnetic flux caused by the rotation of the permanent magnets.

The motor is powered with a sinusoidal voltage of amplitude A, frequency f and phase Φ. The motor so powered is spun at a frequency f. For each control cycle, in order to keep synchronism, the rotor speed is calculated, by considering the time elapsed between two successive pulses of the Hall sensors, and the position is updated. The position is updated every 60 electrical degrees and no technique is proposed for estimating the position of the motor between two edges of the Hall sensors. Yet a different approach from that of Ting-Yu Chang et al., A Hall Sensor Based IPM Traction Motor Drive, IEEE 0-7803-7369-3/02/$17, 2002, J. X. Sheng, Z. Q. Zhu, D. Howe, PM Brushless Drives with Low-Cost and Low-Resolution Position Sensor, IEEE and ST7MC PMAC Sine Wave Control Software Library, STMicroelectronics, Application Note, AN1947/1204 Rev.1.0 is disclosed in Jiri Riba, Sine Voltage Powered 3-Phase Permanent Magnet Motor with Hall sensor, Freescale Semiconductor inc., AN2357, 11/2002.

SUMMARY OF THE INVENTION

A method may provide for a more precise control than a classic step-mode control, while accomplishing a sensible or noticeable reduction of acoustic noise and of electromagnetic emissions.

The method uses sensors installed in the motor that will permit the production of a pulse, each time the motor rotates for a pre-established angle. It may not be essential that such angular position pulses be generated by the switching edges of signals generated by Hall sensors, nor that the motor be a brushless motor. The method for estimating the change of position of the rotor of a motor maybe applicable also to motors of different type.

According to this method, the variation of position of the rotor of a motor, provided with a plurality of position sensors that generate a pulse at every rotation of the rotor by a pre-established angle, maybe estimated through the following steps: generating a first clock signal at a first frequency; and generating a second clock signal at a second frequency multiple than the first frequency by a certain factor. In each interval between two consecutive position pulses, the method may include counting the number of pulses of the first clock signals between the interval, and counting the number of pulses of the second clock signal in the interval. Each time the number of counted pulses of the second clock reaches the number of pulses of the first clock counted in an interval prior to the currently considered one. The method may include signaling that the position of the rotor has varied by an angle equal to the ratio between the pre-established angle and the factor.

This method may be implemented in a related device that is digital and readily implemented.

BRIEF DESCRIPTION OF THE DRAWINGS

This invention will be described referring to the attached drawings, wherein.

Figure 30:
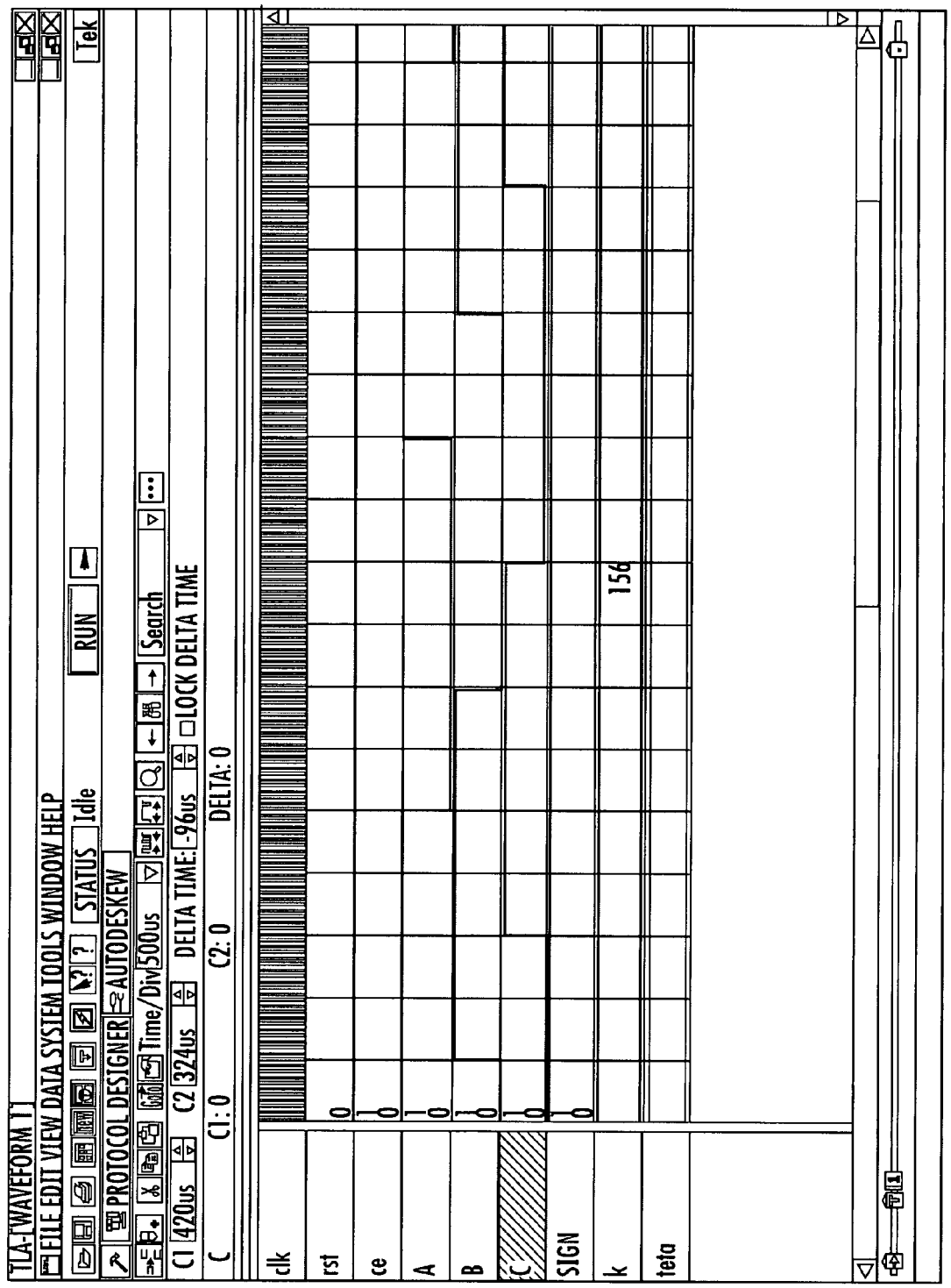
Figure 31:
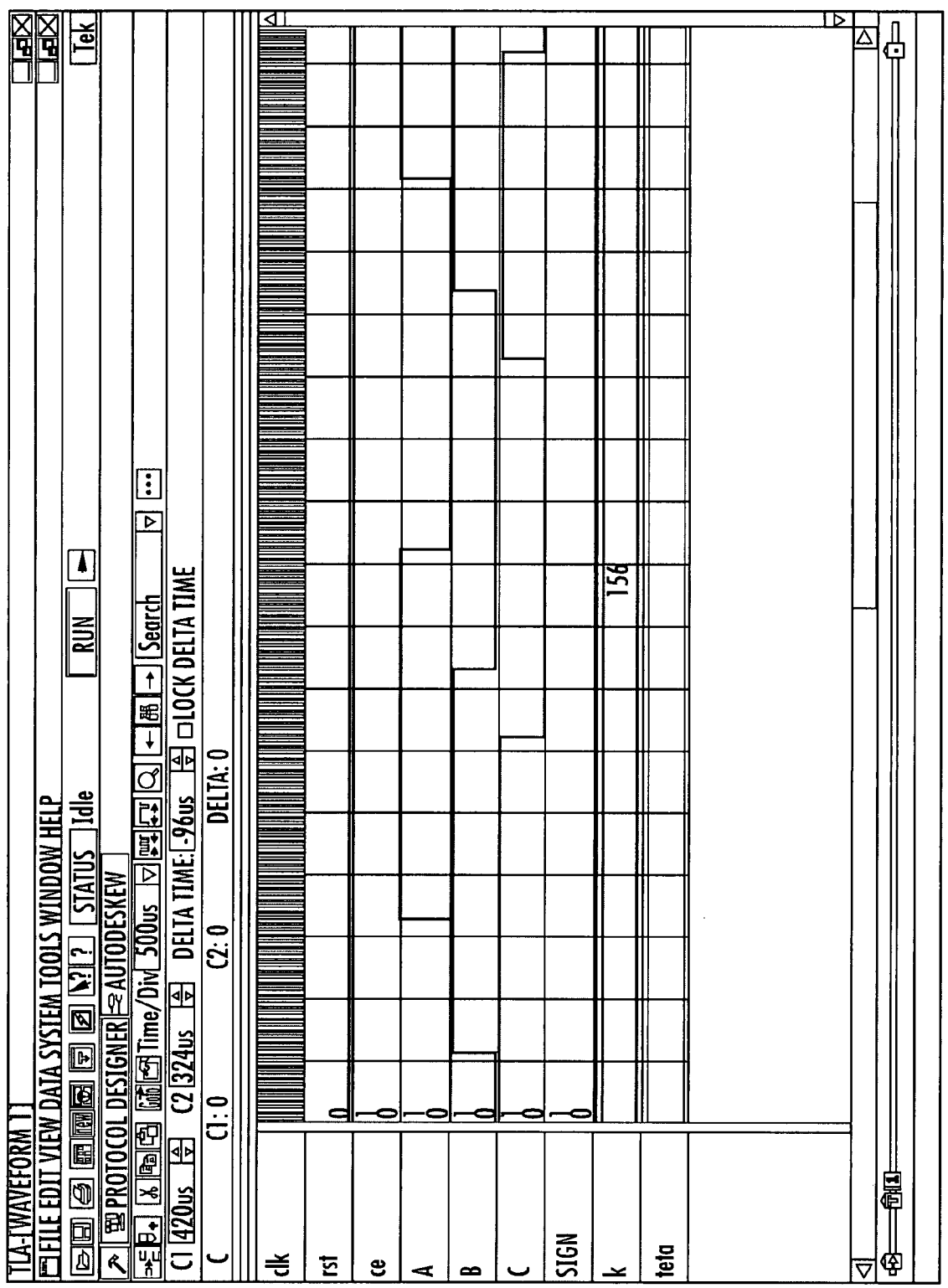
Figure 32:
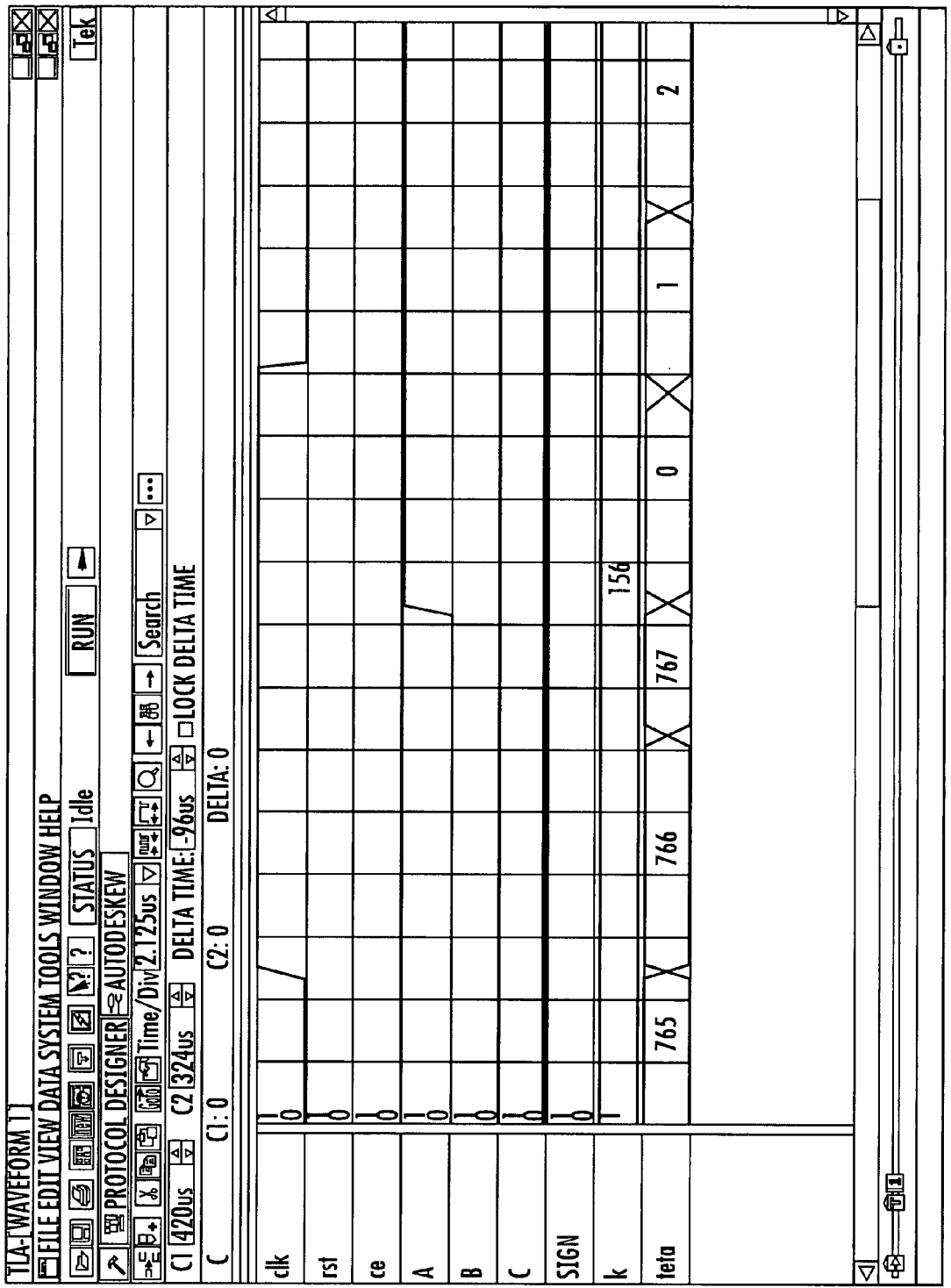
Figure 33:
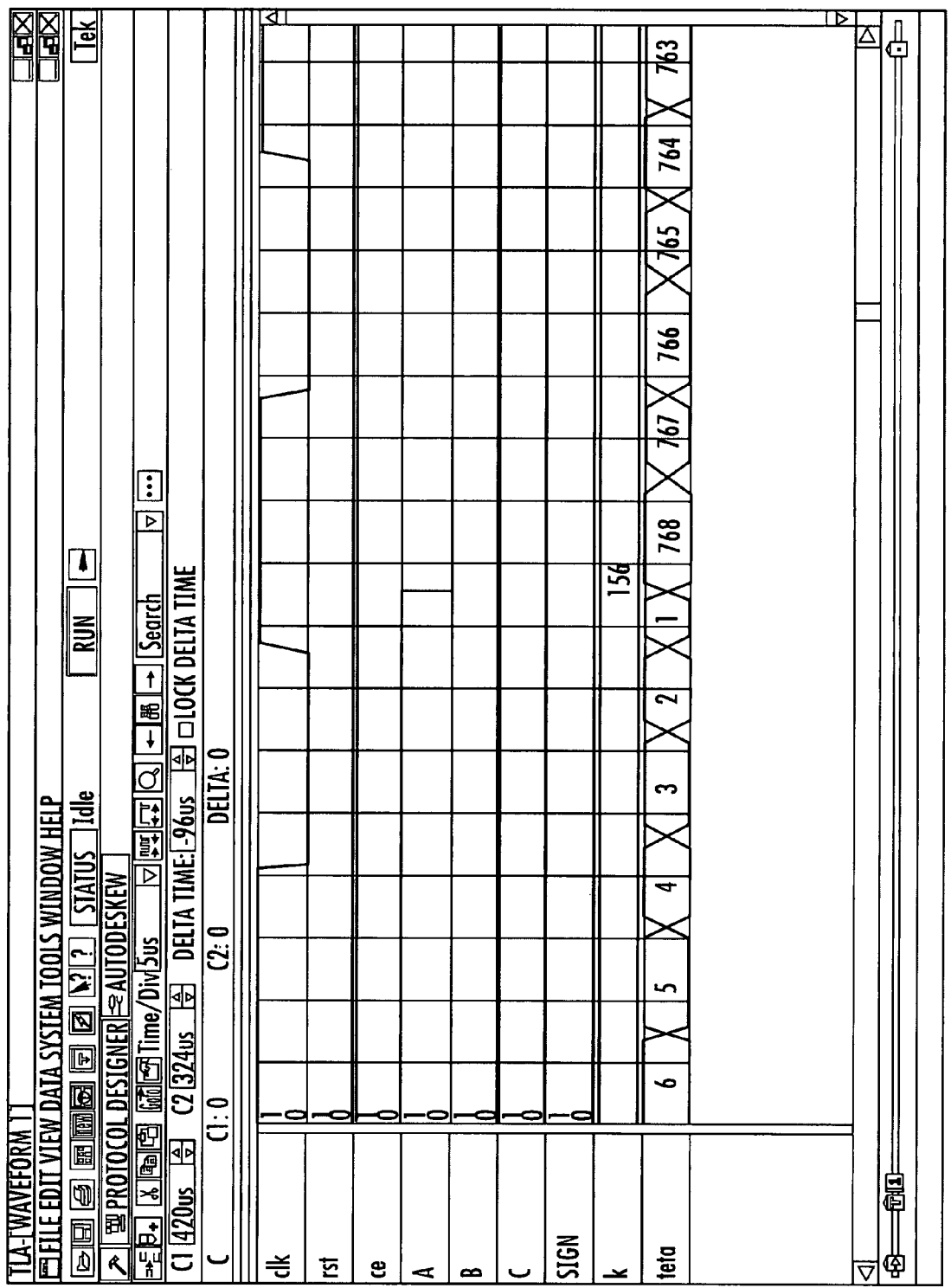

FIGS. from 29a to 29d are graphs that illustrate the performances of the speed (29a and 29c) and position (29b and 29d) estimators realized in Simulink™ and in VHDL, according to the invention;

FIG. 30 is a time diagram of the main signals of the estimator of this invention during an estimation of the angular speed of 5000 rpm in positive sense;

FIG. 31 is a time diagram of the main signals of the estimator of this invention during an estimation of an angular speed of 5000 rpm in negative sense;

FIG. 32 is a time diagram of the main signals of the estimator of this invention during an estimation of an angular position at 5000 rpm in positive sense;

FIG. 33 is a time diagram of the main signals of the estimator of this invention during an estimation of an angular position at 5000 rpm in negative sense.

DETAILED DESCRIPTION OF THE PREFERRED EMBODIMENTS

For simplicity sake, this invention will be illustrated referring to the case of a brushless motor with two polar couples having installed three Hall sensors uniformly spaced one from the other by 120 degrees, though the method of this invention permits the determination of the variation of position and thus the instantaneous position of the rotor of a motor of any kind. Moreover, as will be evident to any skilled person, it is not mandatory to use Hall sensors, but any kind of sensors as long as suitable for producing a pulse at each rotation of the rotor by a pre-established angle may be used. For instance, optical encoders that generate square waveforms similar to those generated by Hall sensors and having edge detectors that emit a pulse at each leading or trailing edge of these signals can be used instead of the Hall sensors.

Figure 1:
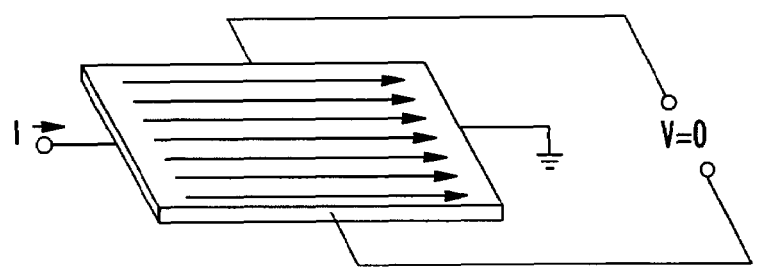
FIGS. 1 and 2 illustrate the Hall effect with a null and non null electrical filed, respectively, as in the prior art.
Figure 2:
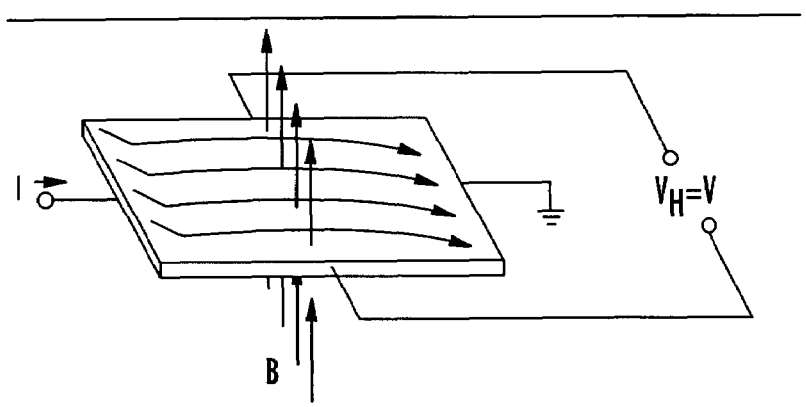
Figure 3:
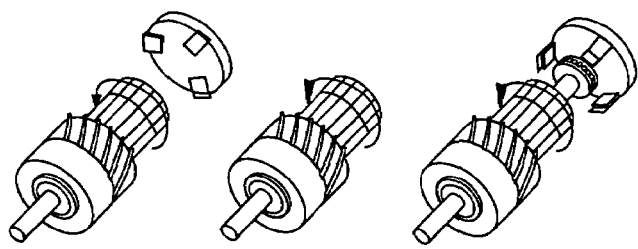
FIG. 3 illustrates a typical mounting scheme of Hall sensors on brushless motors, as in the prior art.
Figure 4:
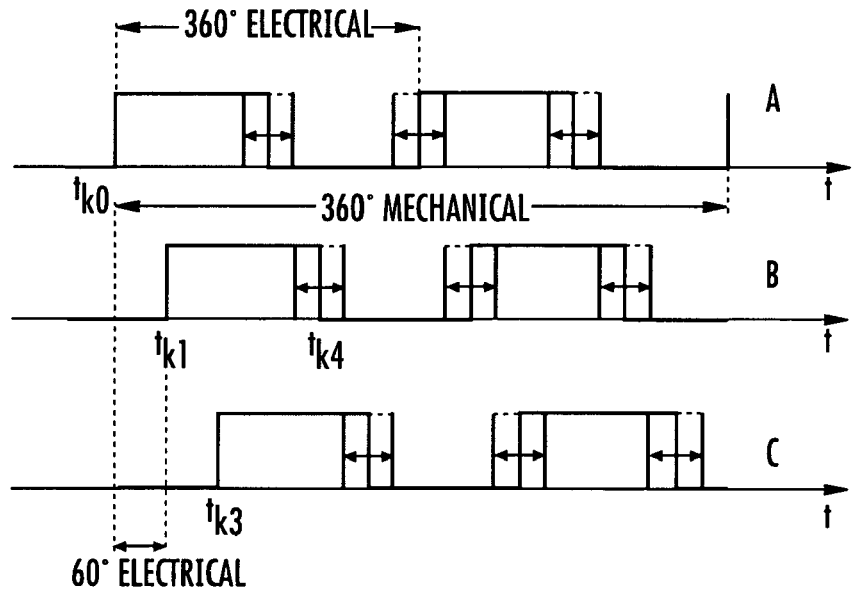
FIG. 4 shows waveforms of Hall sensors for a PMSM with two polar couples, as in the prior art.
Figure 5:
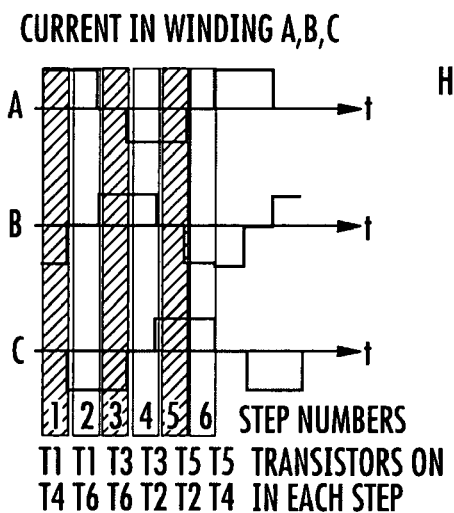
FIG. 5 shows a sample step-mode switching pattern, as in the prior art.
Figure 5:
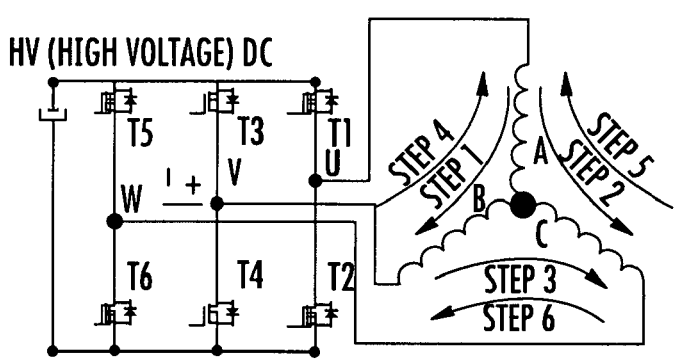
Figure 6:
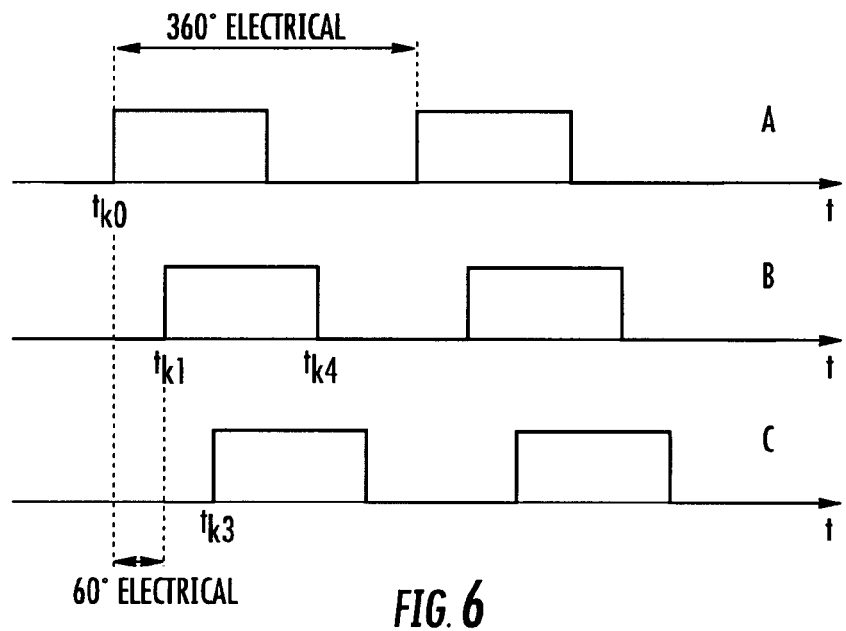
FIG. 6 shows a sample switching pattern of Hall sensors for a PMSM with two polar couples, according to the invention.

According to the embodiment described, the estimation of the angular position and of the speed is obtained by processing the signals generated by Hall sensors. These signals, as shown in FIG. 6, have a square waveform and are such that in a period the rotor rotates by 360 electrical degrees. Moreover, the mutual outphasing between the two waveforms is 60 electrical degrees, because of the locations in which the sensors are installed on the motor.

In correspondence of each leading and trailing edge of the three square-wave signals, a position pulse is generated. Every time a pulse is generated, it means that the rotor has rotated by 60 electrical degrees. In the considered example, the motor has two polar couples, thus a rotation by 60 electrical degrees corresponds to a rotation by 30 mechanical degrees.

Figure 7:
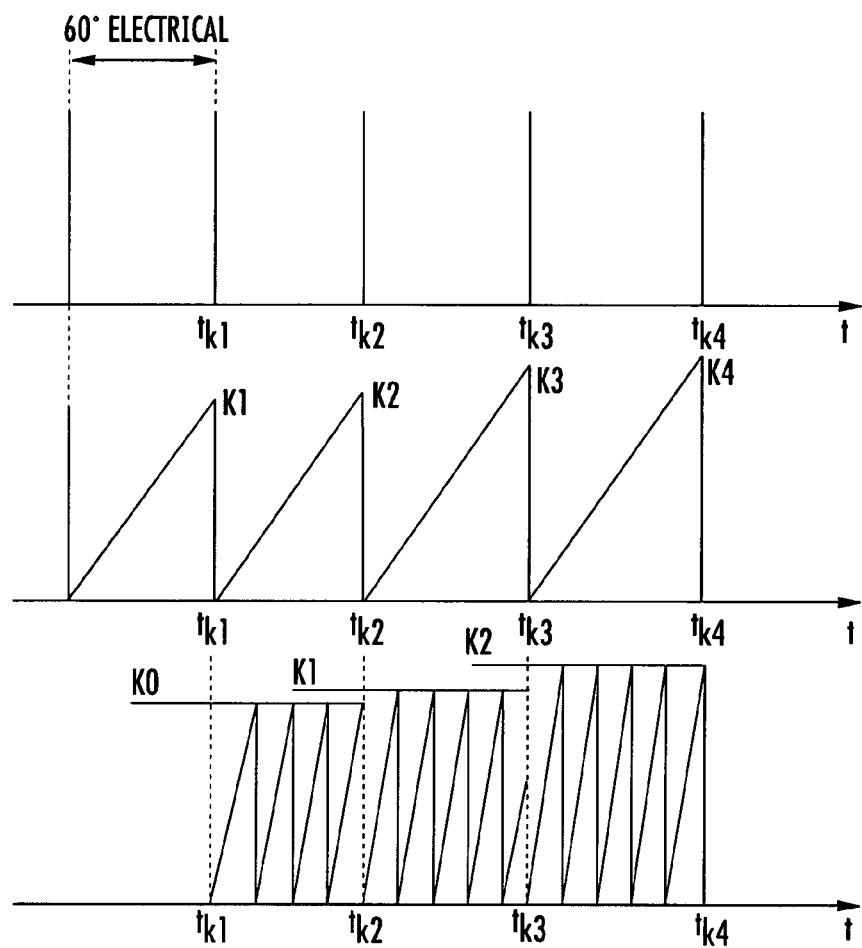
FIG. 7 shows (a) a train of pulse obtained from leading and trailing edges of the three signals; (b) waveforms generated by the slow timer; (c) waveforms generated by the fast timer, according to the invention.

If the succession of leading and trailing edges of the three square waveform Hall sensor signals is considered, the train of position pulses shown in FIG. 7a is obtained, wherein the time distance between two consecutive pulses corresponds to a rotation by 60 electrical degrees. Once the position of the rotor is known, by measuring the time elapsed between the detection of two consecutive pulses it is possible to estimate the speed.

This method provides a very effective method that may be easily implemented for estimating the time elapsed between two pulses and the instantaneous position of the rotor. According to this method, two timers synchronized to the edges of the pulse position signal and with different counting speeds are used. The ramp signals generated by the two timers are illustrated in FIGS. 7b and 7c.

The slow timer has a cyclic counting period longer than the time between two successive pulses, such to be reset at each pulse of the signal of FIG. 7a (in the depicted sample case, at each 60 degrees) before having reached the end-count. The value $K_i$ reached by the timer at the instant in which the successive pulse arrives, is representative of the time used by the rotor for rotating by 60 electrical degrees and thus it provides an estimation of the rotor speed.

Once the value of $K_i$ is known, the speed is substantially determined except for a multiplication factor. The time $t_x$ needed for rotating by 360 electrical degrees is calculated using the following equation:

$$60:K_i \cdot T_L = 360:t_x \tag{2}$$

$T_L$ being the period, expressed in seconds, of the slow timer, thus:

$$t_x = 6K_i T_L \tag{3}$$

the frequency of electrical rotation is thus $$\omega_{electrical} = \frac{1}{6 \cdot K_i \cdot T_L} \frac{\text{rev.}}{\text{s}} \tag{4}$$

considering the appropriate conversion factor, the above equation becomes $$\omega_{electrical} = \frac{10}{K_i \cdot T_L} \frac{\text{rev.}}{\text{min}} \tag{5}$$

The motor has two polar couples, the mechanical rotation frequency is:

$$\omega_{mechanical} = \frac{5}{K_i \cdot T_L} \text{ mechanical r.p.m.} \tag{6}$$

The fast timer has a cyclical counting period smaller than the period of times that separates two successive pulses of the signals of FIG. 7a and it is reset at each pulse of the signal of FIG. 7a. Moreover, it is reset in a certain interval $K_{i+2}$ between two successive pulses each time it reaches a counting value $K_i$ equal to the value reached by the slow timer at the end of an antecedent interval. Therefore, displacements of the rotor are estimated each time the fast timer has reached the value $K_i$.

Let us suppose for sake of example that the fast timer be 120 times faster than the slow timer: if the slow timer indicates that the rotor has rotated by 60 electrical degrees, in a time $K_i$, and the fast timer reaches in this time 120 times the threshold $K_i$, then it is estimated that each time that the fast timer is reset the rotor has rotated by:

$$\Delta\theta_x = \frac{60}{120} = 0.5 \text{ electrical degrees} \quad (7)$$

If it were possible to know in advance at which value the counting $K_{i+2}$ of the slow timer in the current interval between two consecutive pulses will stop, it would be possible to know exactly the position of the rotor each time the fast timer reaches the value $K_i$ because it is known how many times the fast timer is faster than the slow timer. This is not possible, thus it is to be presumed that the slow timer will reach at the end of the current interval a value equal to or in any case slightly different from that reached at the end of a preceding interval, for example the counting reached at the end of the second interval before the current interval $K_i$ and the current position of the rotor is estimated with the above indicated formulas. In other words, it is presumed that the speed variation between two consecutive edges of the signals generated by Hall sensors (and thus in 60 electrical degrees) is negligible.

The hypothesis on which this method relies is substantially verified in all practical cases, because generally intervals between two consecutive pulses are relatively short and the approximation with which the rotor position between two consecutive edges of the Hall sensors is known is satisfactory. The angular resolution of the estimator depends, by a multiplication factor equal to 60, on the ratio between the counting period of the fast timer and that of the slow timer.

Figure 8:
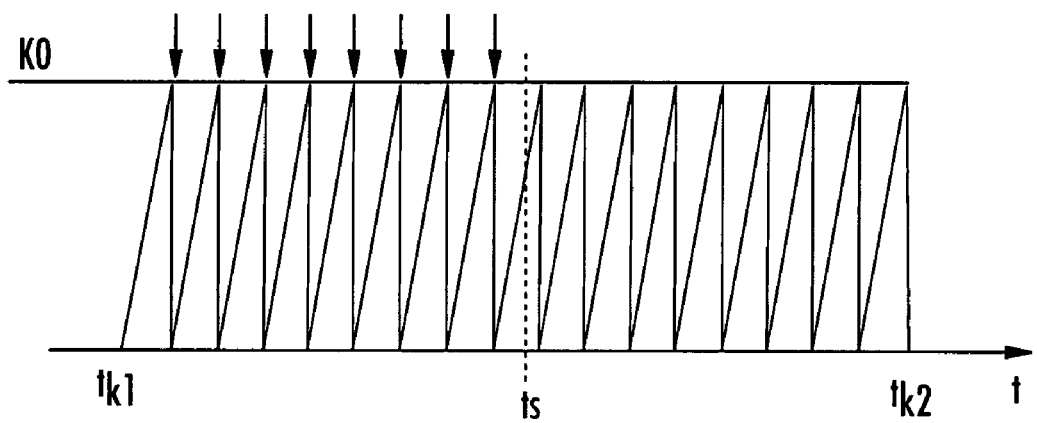
FIG. 8 shows waveforms generated by the fast timer at the instant t=ts, according to the invention.

With the method it is possible to estimate the absolute position $\theta$ of the rotor in a generic instant $t_s$ once the position $\theta_0$ that it assumed in a preceding instant $t_{k1}$ is known. Referring to FIG. 8, at the time $t=t_s$ the fast timer has been reset n times in the same interval between two consecutive pulses, thus the rotor has rotated, starting from the position assumed at time $t=t_{k1}$, by an angle, expressed in electrical degrees, equal to:

$$\Delta\theta = 0.5 \cdot n \quad (8)$$

Therefore, by knowing the position $t=t_{k1}$ and adding the rotation $\Delta\theta$ it is possible to obtain the absolute position of the rotor at the instant $t_s$ through the following relation:

$$\theta = \theta_0 + \Delta\theta \quad (9)$$

Figure 9:
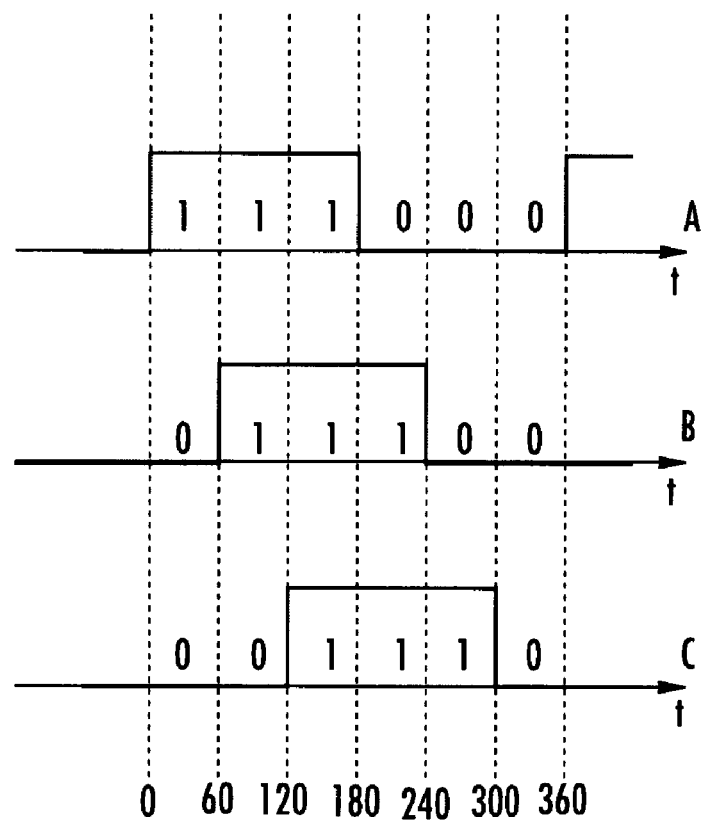
FIG. 9 illustrates how the initial position is determined from the pattern of Hall sensors, according to the invention.

A way for finding the initial position $\theta_0$ may be obtained by observing the pattern of signals of Hall sensors, as shown in FIG. 9. The starting position is obtained as shown in Table 1, that associates the state of the Hall sensors to the initial position.

TABLE 1

| State of Hall sensors | Initial position $\theta_0$ |
|---|---|
| 000 | 300 |
| 001 | 240 |
| 010 | don't care |
| 011 | 180 |
| 100 | 0 |
| 101 | don't care |
| 110 | 60 |
| 111 | 120 |

The words "don't care" indicate a condition of indetermination because the corresponding state is not contemplated for Hall sensors in any instant. The larger the ratio between the speed of the second timer and the speed of the first timer, the larger is the resolution that may be obtained on the estimation of the rotation. The above described method allows estimation of the speed in a direction only, assumed as positive. With a second embodiment, the speed and the position in the case in which the rotor may rotate also in the opposite sense may be estimated.

Figure 10:
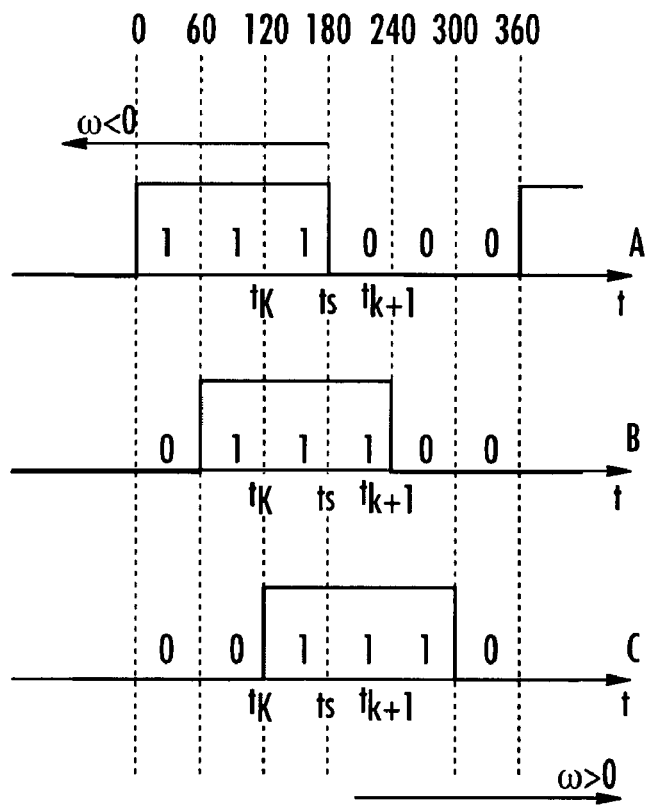
FIG. 10 illustrates how negative speeds are estimated according to the invention.

The modifications to be introduced in the algorithm in the case in which it may be necessary to estimate also negative speeds are: the rotation frequency $\omega$ is measured as in the previous case, but a mechanism that discriminates the direction of rotation of the rotor and thus of the sign of the speed is used; and as far as the estimation of the position is concerned, the rotation $\Delta\theta$ is negative and thus it must be subtracted from the starting position instead of being added to it; therefore the same values of $\theta_0$ are to be redefined, as shown in FIG. 10.

A method for establishing the direction of rotation of the motor and a method for estimating the position of the rotor also in the case in which the speed of the motor reverses are proposed hereinbelow. Let us suppose to be at the instant $t=t_s$: the Hall sensors are in the configuration 111 and the situation is that of FIG. 10. If the speed is positive (that is the rotor rotates counterclockwise) the successive state of the sensors is 001 while if it is negative (clockwise) the successive state is 110. Considering all possible cases, it is noticed that, if the states of Hall sensors in a generic instant $t_k$ and in a successive instant $t_{k+1}$, after a transition edge of a signal generated by a Hall sensor has occurred, are considered, it is always possible to infer whether or not the speed is positive depending on the variation of the states of the signals generated by the Hall sensors. Being $(a_k\ b_k\ c_k)$ and $(a_{k+1}\ b_{k+1}\ c_{k+1})$, the states at instants $t_k$ and $t_{k+1}$, respectively, it is possible to formulate a Boolean function for establishing the sign of $\omega$ according to Table 2:

TABLE 2

| $(a_k\ b_k\ c_k)$ | $(a_{k+1}\ b_{k+1}\ c_{k+1})\ \omega > 0$ | $(a_{k+1}\ b_{k+1}\ c_{k+1})\ \omega < 0$ |
|---|---|---|
| 000 | 100 | 001 |
| 001 | 000 | 011 |
| 010 | don't care | don't care |
| 011 | 001 | 111 |
| 100 | 110 | 000 |
| 101 | don't care | don't care |
| 110 | 111 | 100 |
| 111 | 011 | 110 |

It is easy to verify that, considering the indetermination conditions ("don't care") and after minimizing the Boolean function, the following relation is obtained:

$$y = a_k\overline{b_{k+1}} + b_k\overline{c_{k+1}} + c_k a_{k+1} + \overline{a_k}b_{k+1} + \overline{b_k}c_{k+1} \quad (9)$$

If the variable y assumes a low logic value, the rotor is rotating in a positive direction, in the opposite case in a negative direction. Evidently, the number of logic states to be considered depends on the number of Hall sensors installed on the motor. Starting from the above example, a skilled person is capable of calculating the corresponding Boolean function for determining the direction of rotation of the rotor in the case in which more than three Hall sensors are installed on the motor. With this method, it is possible to estimate both the modulus and the sign of the rotation of the rotor.

The logic state of the signals generated by Hall sensors allows the determination of the initial position of the rotor. Let us suppose to be at the instant $t=t_s$ and that the Hall sensors are in the configuration 111. If $\omega>0$, the displacement is to the right and the starting position is that corresponding to the edge at $t=t_k$. If $\omega<0$, the displacement is to the left and the starting position is corresponding to the edge at the instant $t_{k+1}$: as a consequence, the initial start position is rotated by 60 electrical degrees.

By generalizing the above rule, the following Table 3 updated with the start positions both in the case of positive as well as negative positions is obtained.

TABLE 3

| State of Hall sensors | Initial position $\omega > 0$ | Initial position $\omega < 0$ |
|---|---|---|
| 000 | 300° | 360° |
| 001 | 240° | 300° |
| 010 | don't care | don't care |
| 011 | 180° | 240° |
| 100 | 0° | 60° |
| 101 | don't care | don't care |
| 110 | 60° | 120° |
| 111 | 120° | 180° |

For estimating a null speed, it may be necessary to wait for an infinitely long time interval. In order to solve this problem, a threshold corresponding to a minimum detectable speed is established: if the estimator of this invention establishes that the motor speed is smaller than this minimum value, then it considers it equal to zero. This result is obtained, according to a preferred embodiment, by establishing a maximum time interval that, when it is elapsed, the estimator flags that the motor is still.

Figure 11:
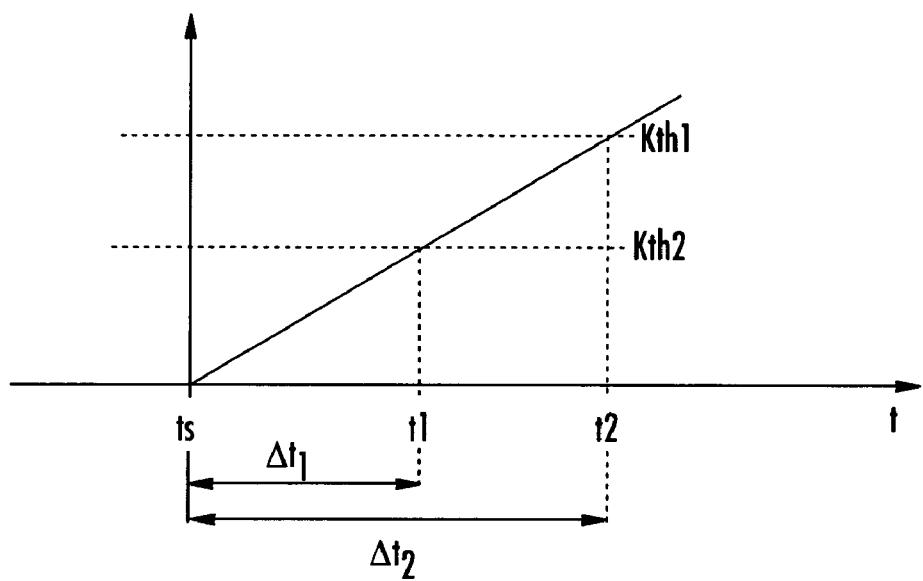
FIG. 11 shows the trade-off between the estimated speed versus the delay with which the estimator of this invention senses that the motor is still, according to the invention.

The smaller the minimum speed that may be established, the longer is the delay with which the estimator recognize that the motor is still. Referring to FIG. 11, let us suppose that for simplicity sake that at the instant $t_s$ the motor stops and that at the same instant the slow timer starts. What will be stated holds, mutatis mutandis, also in the general case in which this hypothesis is not verified.

If the maximum time that may be measured corresponds to the value $k_{th1}$, the estimator of this invention recognizes that the motor is still only when the timer has reached the maximum counting, that is at the instant $t_1$ and thus with a delay equal to $\Delta t_1$. If the minimum detectable speed is to be reduced, it may be necessary to increase the maximum measurable time up to the threshold $k_{th2}$. As a consequence, the system will determine that the motor has stopped only at the instant $t_2$, with a delay equal to $\Delta t_2 > \Delta t_1$. For this estimator it is possible to affirm that the improvement of static performances (that is a reduction of the minimum detectable speed) is paid, as it happens often, with a worsening of the dynamic performances (that is the system uses a longer time for recognizing that the motor is still).

At the start-up of the motor, while calculating the angular speed it may be necessary to consider that the first time value measured by the slow timer does not corresponds to an angular displacement by 60 electrical degrees, but it is smaller. This is due to the fact that, at the start-up, it is not in general true that the motor is in the position assumed as reference position, that is immediately after a switching edge of Hall sensors. By applying equation (6), a larger absolute value of the speed than that of the real speed would be estimated.

According to an embodiment of the method, the datum provided by the slow timer synchronous with the first switching of the Hall sensors is discarded.

Simulation by Simulink™

Speed Estimation

Figure 12:
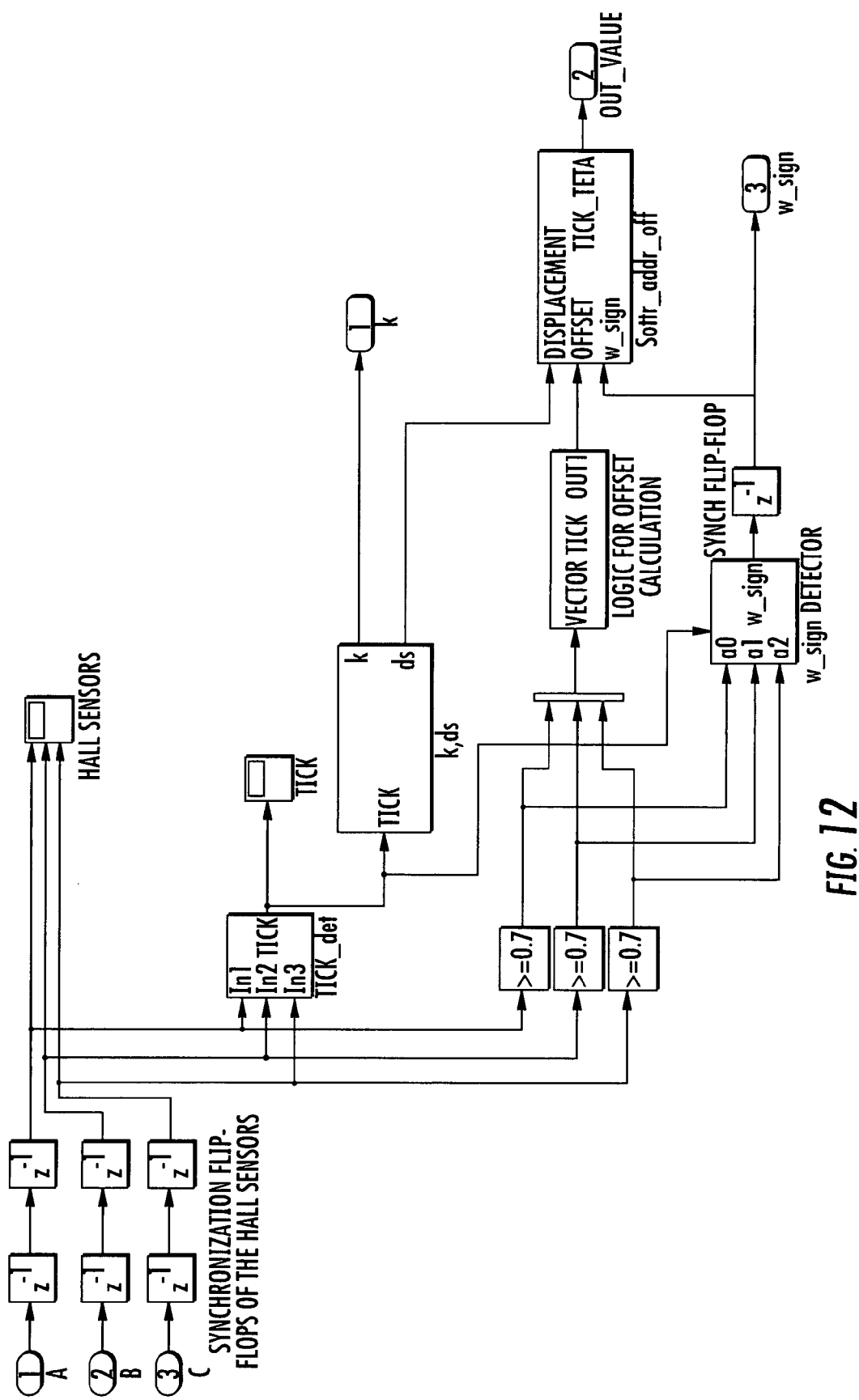
FIG. 12 shows a block diagram of the position and speed estimator, according to the invention.

FIG. 12 shows a block diagram of a sample embodiment of the estimator. From the three Hall sensors, the following quantities are calculated: the counting of the slow timer from which it is possible to obtain information about the time used by the rotor for rotating by 60 electrical degrees; the absolute electrical position of the rotor; and the sign of the speed, that considers the direction of rotation of the rotor.

Figure 13:
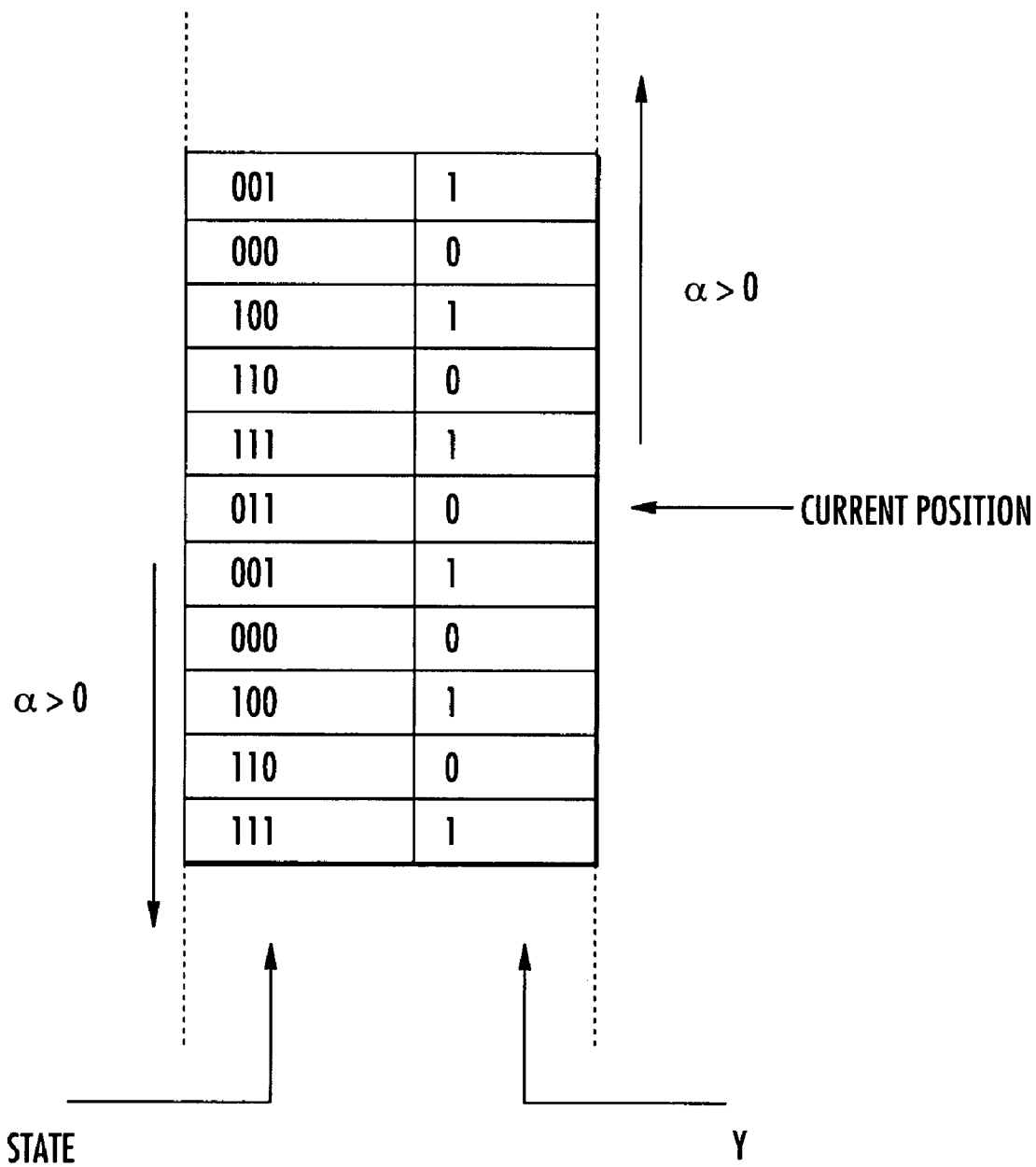
FIG. 13 shows the switching states of the Hall sensors, according to the invention.

After having made synchronous the Hall sensors with the system clock for avoiding instable states (operation simulated in Simulink™ using delays), the first part of the processing of the signals of the Hall sensors includes generating a signal that switches synchronously with the edges of the three inputs. FIG. 13 shows that if a signal Y is generated as XOR among three inputs, the resulting signal switches each time that any sensor switches, in both cases of positive and negative speed, because of the sequence of states assumed by the sensors.

Once a signal that switches at each leading and trailing edge of any of the inputs, the evolutions of the timers are managed for making the estimator function correctly. The system is substantially composed of three counters, that measure parameters that may be necessary for determining the time interval between the generation of two consecutive pulses of Hall sensors and the rotation of the rotor in a time interval that goes from the last switching event of one of the sensors up to the observation instant.

The slow counter is a counter that is reset each time that a pulse is generated starting from the signals generated by the Hall sensors and allows estimation of the speed of the rotor even when it is null. The fast counter is reset each time that a threshold value is reached (equal to the value of k counted by the slow counter at the previous pulse generated from Hall sensors) and when the slow counter generates a high reset pulse. The third counter counts the number of times cnt the fast counter is reset in a same interval between two consecutive pulses of Hall sensors.

For sake of example, let us suppose of having a working frequency of 20 MHz and that the slow counter has a clock period $T_{CLK\text{-}slow}$ of $$T_{CLK\text{-}slow} = 128 \cdot T_{CLK}$$

being $T_{CLK}$ the period of an oscillator used as a reference.

Being k the counting of the slow counter before the reset operation; between two edges of the Hall sensors a time, in seconds, equal to $$K_i = k \cdot T_{CLK\text{-}slow}$$

has elapsed. For equation (6), $$\omega_{mechanical} = \frac{5}{K_i} = \frac{5}{k \cdot T_{CLK\text{-}lento}} = \frac{5 \cdot 10^9}{k \cdot 128 \cdot 50} = \frac{10^8}{128 \cdot k} \text{ mechanical r.p.m.} \quad (10)$$

In order to know the position and thus the rotation corresponding to the counting cnt output by the third counter, given that 60 electrical degrees corresponds to a counting of 128, the following equation holds:

$$\Delta\theta = \frac{60}{128} \cdot cnt \quad (11)$$

Preferably, the counting value corresponding to 60 electrical degrees is an integer power of two, in order to facilitate the execution via hardware of the division of the counting frequency but also, and especially, for sake of ease in managing the numerical representation, as will be more evident later on.

Equation (11) provides the conversion factor that allows obtaining, given the output of the estimator, the angular position relative to the last switching edge of the Hall sensors. As already explained, in order to obtain the absolute angular position, it may be necessary to add a properly calculated value of the initial position to the relative rotation: the presented solution consists in adding multiples of 60° to the relative position, depending on the state of Hall sensors. Given that a rotation by 60 electrical degrees corresponds to a value of cnt equal to 128, the link between the output of the estimator and the absolute position of the rotor is given in Table 4.

TABLE 4

| Output value out_val | Absolute angular position [deg] |
|---|---|
| 0 | 0 |
| 60 | 128 |
| 120 | 256 |
| 180 | 384 |
| 240 | 512 |
| 300 | 640 |
| 360 | 768 |

The absolute angular position of the rotor, considering as reference angle the occurrence of the state (100) for the three Hall sensors, is expressed in degrees according to the relation $$\theta = \frac{360}{768} \cdot out\_val \quad (12)$$

Each sector includes 128 values and if the unsigned binary representation of the output of the estimator of the angular position is examined, as illustrated in Table 5, it is possible to notice that, given any output value of the estimator, the three most significant bits correspond exactly to the binary coding of the number of the sector while the other bits correspond to the same angle re-scaled in a range [0°, 60°].

TABLE 5

| Estimated position (degrees) | Decimal representation | Binary representation |
|---|---|---|
| 0 | 0 | 0000000000 |
| 60 | 128 | 0010000000 |
| 120 | 256 | 0100000000 |
| 180 | 384 | 0110000000 |
| 240 | 512 | 1000000000 |
| 300 | 640 | 1010000000 |

What has just been asserted may be demonstrated with an example: let us suppose that the estimator of angular position outputs a value that in decimal notation is $(448)_{10}$. By applying the conversion factor in equation (12), the value of 210 electrical degrees is obtained: this angle belongs to sector 3 and it is characterized by a re-scaled angle equal to 30 degrees.

| Position | Representation | Sector | Re-scaled angle | Relative position |
|---|---|---|---|---|
| 210 deg | $(448)_{10} =$ $(0111000000)_2$ | $(011)_2 =$ $(3)_{10}$ | $(1000000)_2 =$ $(64)_{10}$ | 30 deg |

This example shows what has been affirmed: thanks to this representation, the logic for recognizing the sector and the re-scaled angle does not increase computational burden nor increases the used hardware resources.

Figure 14:
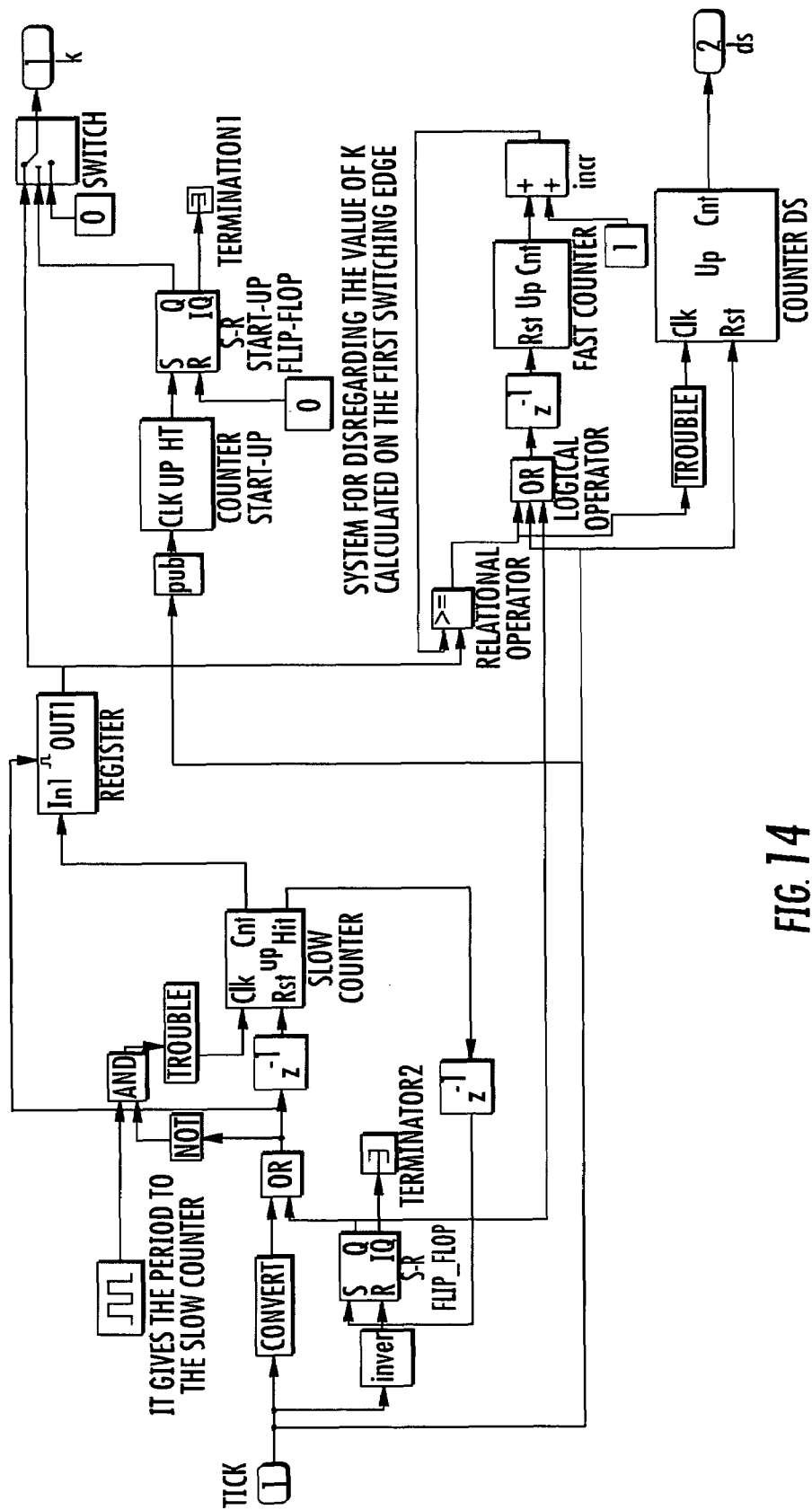
FIG. 14 is a block diagram of the "core" of the position and speed estimator of according to the invention.

In the core of the estimator it is considered also an eventual situation in which the motor is still and it may be necessary to estimate a null speed. This recognition is managed, as shown in FIG. 14, through the output H$_{IT}$ of the slow counter, that is high when the timer has reached the maximum measurable time and thus the counter has reached the end count value. Let us suppose that the motor is still or that it rotates at a speed smaller than the minimum measurable speed: after the time necessary to let the counter reach its end count value, the signal H$_{IT}$ switches high and sets the flip-flop RS that resets both the slow and the fast counter. Because of this reset, the output value of the estimator is null. It may be necessary to carry out an appropriate control for preventing a "divide-by-zero" condition for assigning a null speed to a null measured time.

Because of the peculiar architecture of the system, if the motor is restarted, at the successive switching edge of the signal coming from Hall sensors, the flip-flop is reset and the slow counter starts counting. In this case, if the speed is smaller than the minimum detectable speed, after the time necessary for saturating the slow counter, the signal H$_{IT}$ switches high again and the above described sequence is repeated. As an alternative, at the successive switching edge of the pulse signal, the counting of the timer is output.

During the start-up of the motor, the first value output by the estimator relates to a rotation smaller than 60 electrical degrees and thus it is not valid for calculating the speed. The estimator contemplates the possibility of setting a preload value as a first output value, that is null in the example of FIG. 14. Indeed, at the start-up, the switching edges up to the second of the Hall sensors are counted.

When the second switching edge is received, a bi-stable circuit is set at a high logic level. The output of this bi-stable circuit is a selection signal of a multiplexer, that makes the multiplexer output the counting value at the first edge of the Hall sensors and a default value at the successive edges. Besides estimating the absolute value of the speed, the system of FIG. 12 estimates also its sign, that is the direction of rotation of the motor, that is assumed positive when counter-clockwise.

Figure 15:
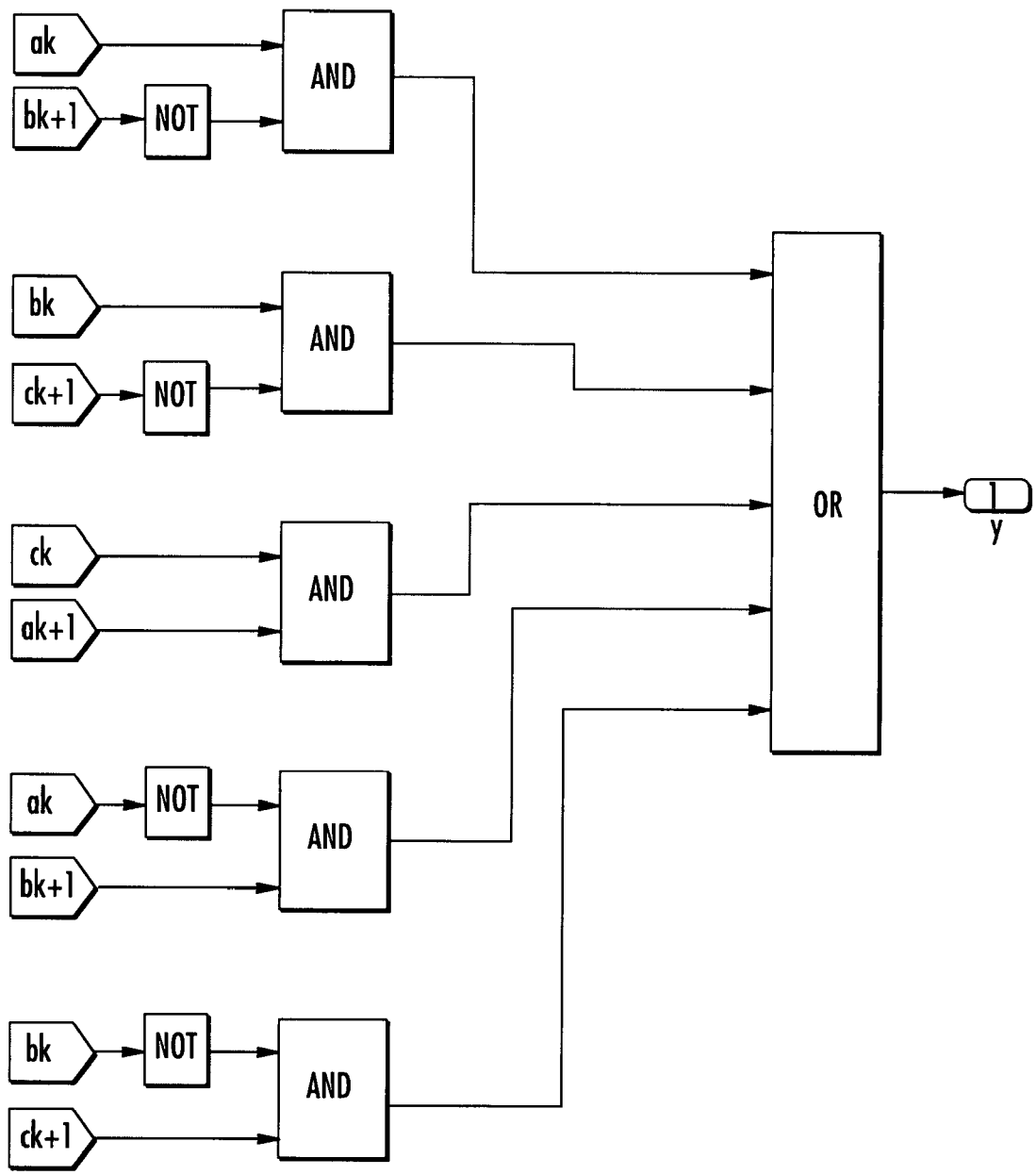
FIG. 15 shows the logic network used for determining the rotation sense, according to the invention.

FIG. 15 depicts the logic circuit that determines whether the speed is positive or negative, that is realized in a purely combinatory fashion, in accordance with the following Boolean expression:

$$y = a_k\overline{b_{k+1}} + b_k\overline{c_{k+1}} + c_k a_{k+1} + \overline{a_k} b_{k+1} + \overline{b_k} c_{k+1} \quad (13)$$

To this end, it may be necessary to store the state of Hall sensors corresponding to the previous edge of the pulse signal. This problem has been solved through dedicated flip-flops.

Estimation of the Angular Position

Figure 16:
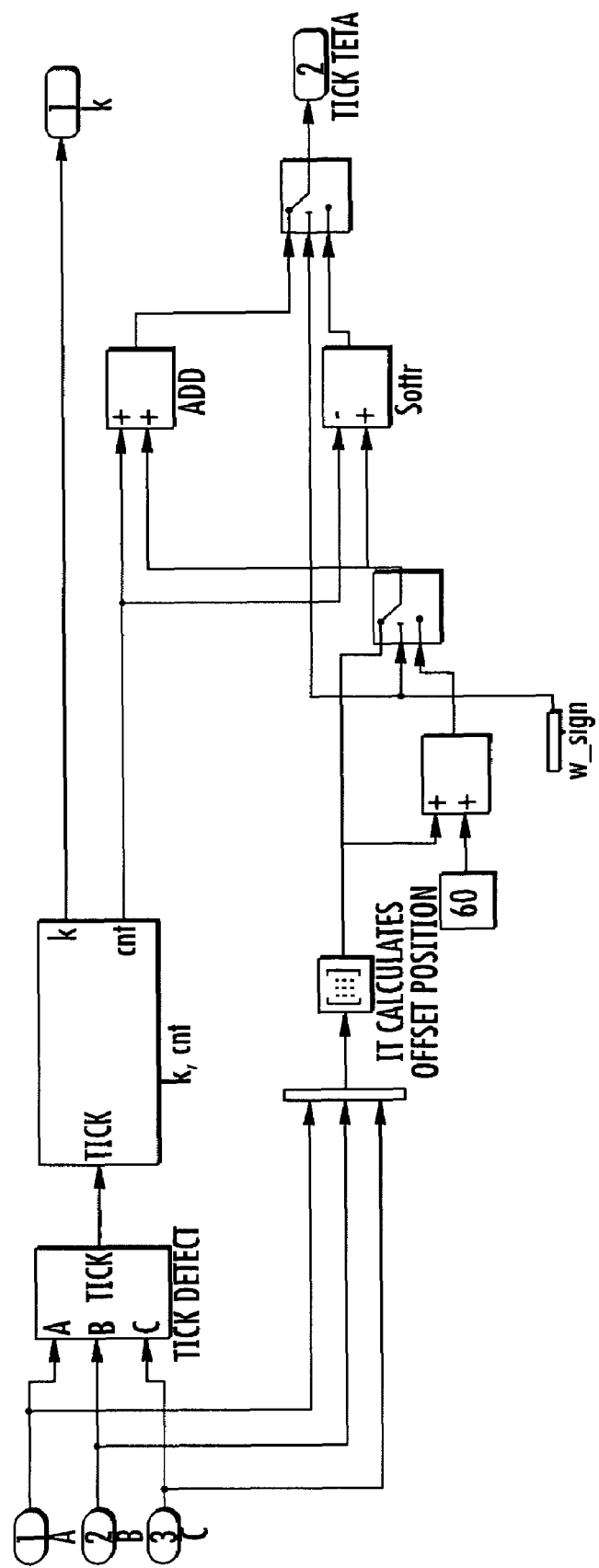
FIG. 16 shows the logic circuit used for calculating the initial position, according to the invention.

The system of FIG. 14 calculates, in a generic instant, the value of the rotation $\Delta\theta$ of the motor in respect to the position assumed at the instant in which the last switching edge of the Hall sensors is detected. In order to determine the absolute position, it may be necessary to calculate the initial position $\theta_0$, determined using the above illustrated criteria. The implemented logic is illustrated in FIG. 16.

In the case in which $\omega$>0, the rotation $\Delta\theta$ s added to the starting position $\theta_0$, By contrast, if $\omega$<0 the starting position is incremented by 60 electrical degrees in respect to the previous case and the rotation is subtracted from the starting position.

From equation (11) it is possible to notice that, given the output value of the estimator, it may be necessary to carry out a multiplication and a division to obtain the angular position in degrees: in order to reduce the used hardware resources it is convenient not to execute any conversion, estimating the angle with an integer unsigned value comprised in the range [0, 768]

Limitations

Figure 17:
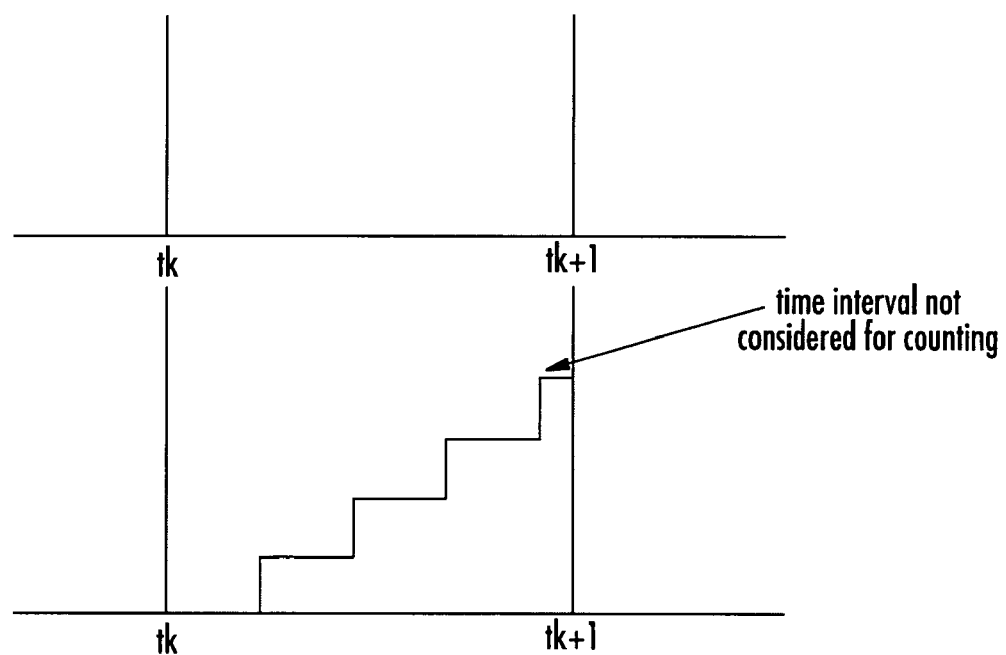
FIG. 17 shows resolution limits of the slow counter.

The slow and the fast timers are typically realized with counters. Let us suppose working at very high speeds, that are of the order of $10^4$ r.p.m. At these speeds, the slow counter generates a quantization error on the measure of the time that elapses between the two edges of the Hall sensors. This error propagates on the speed measurement: the larger the speed, the smaller the time interval between two consecutive pulses of the Hall sensors and the smaller is the counting value of the slow counter, thus the more relevant is the relative quantization error shown in FIG. 17.

in order to reduce the quantization error, it would be convenient to improve the resolution of the counter, increasing the clock frequency of the whole system. This, besides implementation difficulties, implies problem relating to the functioning of the estimator when the motor is running at a relatively low speed. If the duration of the time interval elapsed between two successive switchings of the Hall sensors is very long, the counter may reach its end count value. For example, if a n bit counter is considered, the end count event occurs after the counter has reached the value $2^n-1$ and restarts from the value 0.

Figure 18:
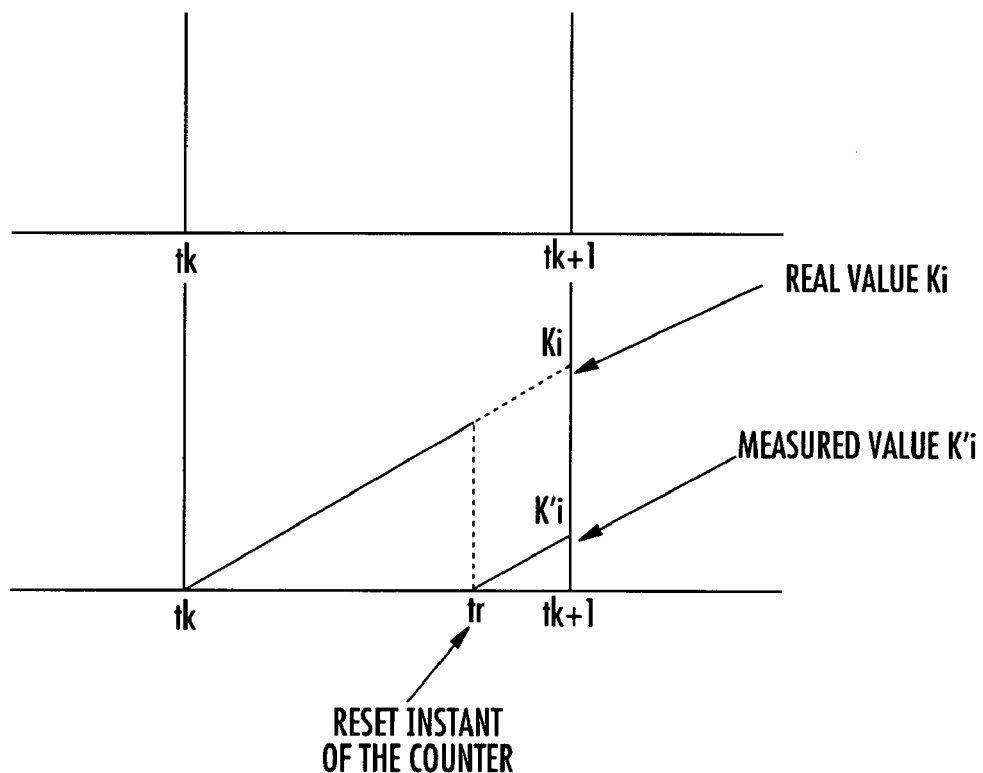
FIG. 18 shows a time graph that illustrates the problems tied to a saturation event of the slow counter, according to the invention.

If the system is not well designed, it may happen that at low speeds, because of the saturation event, as depicted in FIG. 18, the output of the slow counter is $K'_i < K_i$. This means that, the system determines that the rotor has rotated by 60 electrical degrees in a time equal to $T'=t_{k+1}-t_T$ instead of $T=t_{k+1}-t_k$, thus the output value of the speed is not reliable. In this case, in order to prevent saturation of the counter and reducing the number of flip-flops to implement it, it may be necessary to have a clock frequency that is not too high. As stated hereinbefore, it may be necessary to find a compromise among counting frequency, time resolution and needed hardware resources.

Sample Specifications and Design Values

A realistic example of initial specifications for the estimator may be: frequency of 20 MHz in a mechanical speed range of $[10^2,10^4]$ revolutions/minute (r.p.m.) with a maximum error of 1% on the top speed and with an angular resolution of at least 0.5 mechanical degrees. The estimator must recognize also the direction of rotation of the motor.

Starting from the value of the speed expressed in mechanical r.p.m., it is possible to calculate the electrical speed recalling that the motor has two polar couples:

$$\omega_{electrical}=2\cdot\omega_{mechanical}=2\cdot10^4 \text{ electrical r.p.m.}$$

thus $$\frac{\omega_{electrical}\cdot 360 \text{ deg}}{60 \text{ s}} = 12\cdot10^4 \text{ electrical } \frac{\text{rev.}}{\text{s}}$$

because the Hall sensors switch at each 60 electrical degrees, this speed corresponds to a number of pulses per second equal to:

$$\frac{12\cdot10^4}{60} = 2000 \frac{\text{pulses}}{\text{s}}$$

Thus the time interval elapsed between two consecutive switches is $\Delta t_x$=0.5 ms. As a consequence, the counting value k of the slow counter is:

$$k = \frac{\Delta t_x}{T_{CLK-slow}} = \frac{0.5\cdot10^{-3}}{128\cdot50\cdot10^{-9}} = 78.125 \approx 78$$

If at a speed of $10^4$ mechanical revolutions per minute corresponds to a counting k=78 of the slow counter, this means that at each counting event of the counter corresponds a speed equal to:

$$\frac{10^{-4}}{78} \approx 128 \frac{\text{mechanical r.p.m.}}{\text{counting}}$$

If an error equal at most to a counting event, the percentage error is $$\varepsilon = \frac{128}{10^4}\cdot 100 \approx 1.3\%$$

As explained above, the angular resolution of the estimator depends, besides a multiplication factor equal to 60, from the ratio between the counting period of the fast timer and the counting period of the slow timer. In the considered case, a ratio equal to 128 is considered, thus the angular resolution is $$\delta = \frac{60}{128} \approx 0.47 \text{ electrical degrees}$$

If the minimum measurable speed is $10^2$ mechanical r.p.m., the slow counter must be capable of measuring a maximum time interval $\Delta t_x$ at least equal to 50 ms without saturating. The maximum counting value must be $$k_{max} = \frac{\Delta t_x}{T_{CLK-slow}} = \frac{50\cdot10^{-3}}{128\cdot50\cdot10^{-9}} \approx 7812$$

Therefore, it may be necessary to design the slow counter with a number of flip-flops nff equal to $$nff=\log_2(k_{max})=\log_2(7812)\approx 13$$

At the design working frequency, the maximum time that may be measured between two pulses is, using a 13-bits counter:

$$\Delta t_{MAX} = (2^{13} - 1) \cdot T_{CLK\text{-}slow} \approx 0.05 \text{ s}$$

Given that in an electrical revolution, there are 6 pulses of Hall sensors, the calculated time interval $\Delta t_{MAX}$ corresponds on an electrical revolution to a period of 0.3 s. By resuming, the minimum speed that may be detected from the estimator is $$\omega_{electrical} = \frac{1}{6 \cdot \Delta t_{MAX}} = 3.18 \text{ electrical rev./s}$$

This value corresponds, with the appropriate conversion factor, to $$\omega_{electrical} = 191 \text{ electrical r.p.m.}$$

that is $$\omega_{mechanical} = 95 \text{ electrical r.p.m.}$$

It is worth noting that the estimator needs a time interval of $$T_{STOP} = (2^{13} - 1) \cdot T_{CLK\text{-}slow} \approx 0.05 \text{ s}$$

for detecting that the motor is stopped, for a minimum measurable speed of 95 mechanical r.p.m.

Results of the Simulations

Figure 19:
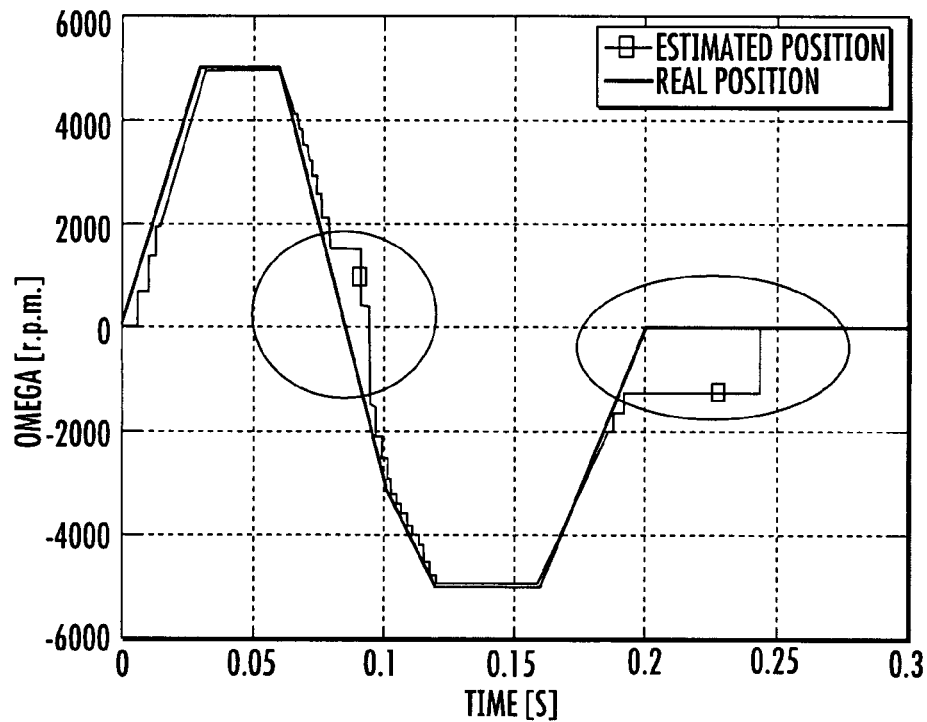
FIG. 19 shows the results of a test for estimating the speed of a motor carried out according to this invention.

For carrying out the simulation tests, the estimator has been tested in input with a variable speed waveform, illustrated in FIG. 19. It is possible to notice how the estimated speed tracks with a good precision the input profile, despite the jitter of Hall sensors: nonetheless, problems and limitations for tracking input speeds close to zero are evident. In particular, two different situations are highlighted in the figure: in the first figure, that constitute a transient zero-crossing, the estimator is not given enough time to reach the saturation threshold of the slow counter. For this reason, in the estimated profile the zero-cross event is not detected. By contrast in the second situation, in which the motor is completely stopped, the estimator locks the input speed profile after about 50 ms, that matches the estimations carried out.

Figure 20:
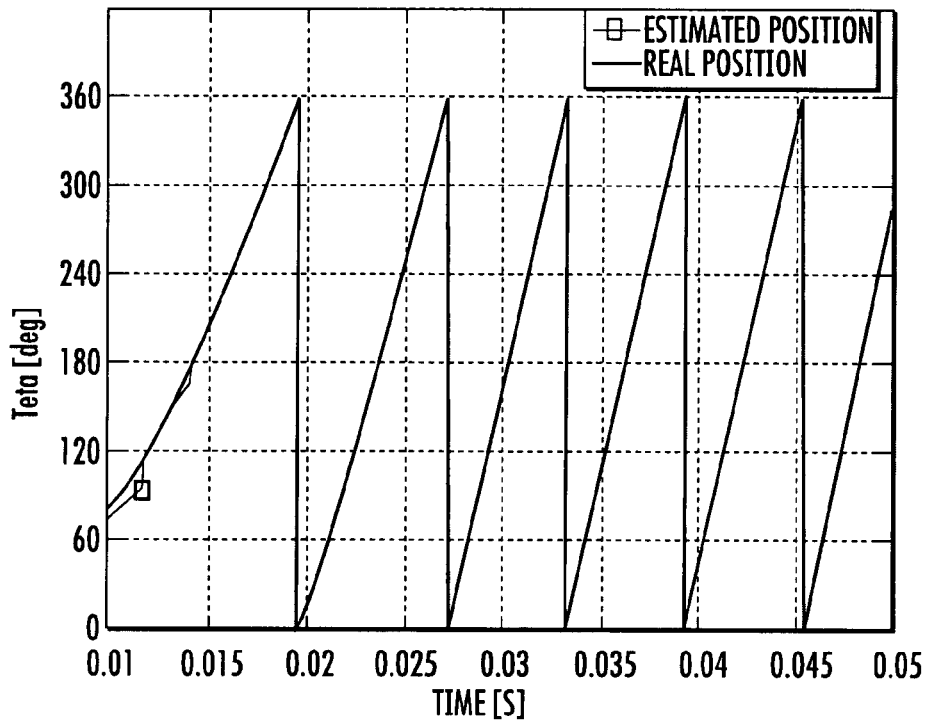
FIG. 20 shows the results of a test for estimating the position of a motor carried out according to this invention with the positive speed profile of FIG. 19.
Figure 21:
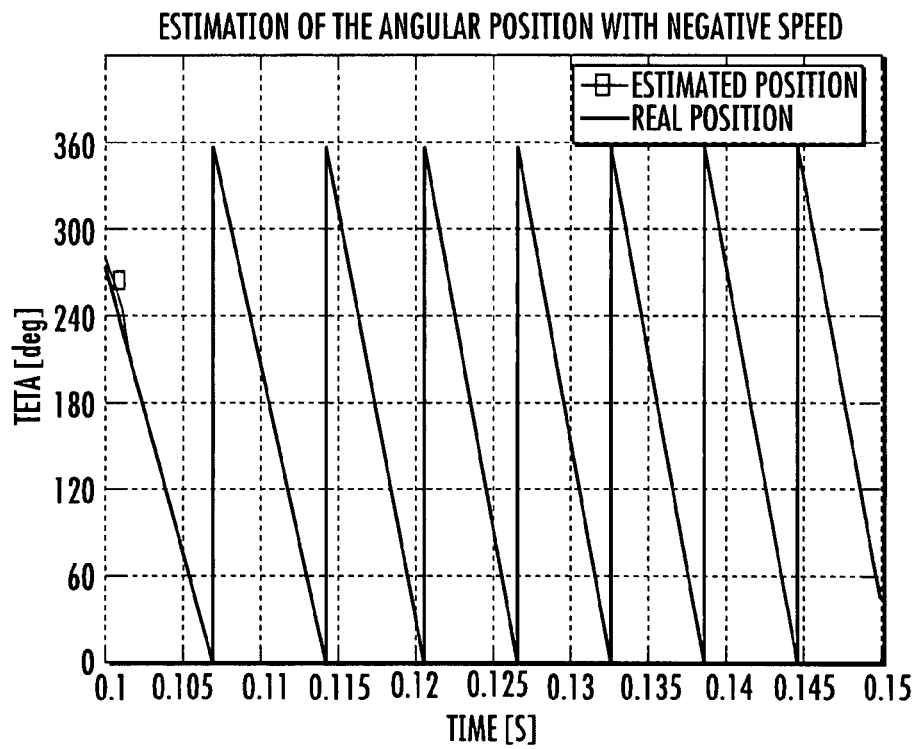
FIG. 21 shows the results of a test for estimating the position of a motor carried out according to this invention with the negative speed profile of FIG. 19.

The results in terms of angular position are highlighted in FIGS. 20 and 21. It is worth observing that the estimator, even if it presents the already mentioned problems at low speeds, operates both for a counterclockwise and a clockwise direction of rotation of the motor.

About the sign of the speed of the motor, it is worth noting that it may be necessary to sample the state of the three Hall sensors before and after the occurrence of each pulse and elaborating them according to the Boolean equation (13). In a real implementation, the sample and hold operations are carried out through flip-flops. At the start-up, the sign calculated for the speed depends from the initial state of the bistable circuits, besides from the configuration assumed by the Hall sensors.

Figure 22:
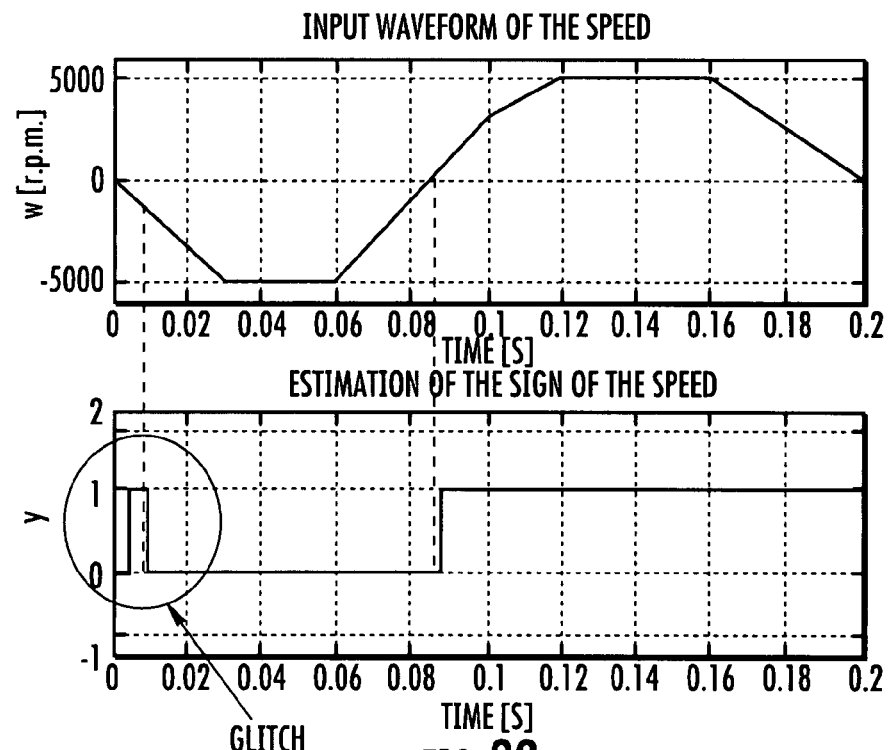
FIG. 22 highlights the presence of a glitch in determining the sign of the speed of the motor.

As depicted in FIG. 22, there is an initial glitch because the sign of the speed, calculated when the first switching edge of Hall sensors occurs, is random and only from the occurrence of the second edge onwards the calculated sign is correct.

In FIG. 22, for the simulation, also the delay due to the implemented combinatorial logic and to synchronization with the system clock has been considered. This is a further reason for which it is convenient to discard the information on the calculated speed when the first switching edge of the Hall sensors occurs: this information is largely incorrect in modulus and it is very likely that also its sign be wrong.

By contrast, if at the start-up a low preload value is imposed, for example a null value, also the problem of the sign is solved and surely the correct direction of rotation of the motor is associated to the first valid estimated value of the speed, synchronous with the occurrence of the second switching edge of the Hall sensors.

Digital Hardware Embodiment using the VHDL Description

After having simulated the algorithm with Simulink™, having the possibility of executing a functional simulation at the system level, a VHDL embodiment has been considered. It may be necessary to consider a series of modifications and a series of differences of implementation between a hardware and a software simulation environment. The system described above, has been implemented in VHDL and a prototype thereof will be realized by a FPGA (Field Programmable Gate Array) XILINX xc2s50, and after it will be tested on a real system.

A first thing to be managed is that the input signals of the control system, that is the Hall sensors, are asynchronous in respect to the internal clock of the FPGA: therefore, there could be problems due to the management of asynchronous signals, that in general are relatively difficult to be controlled. In order to solve this problem, synchronization flip-flops connected in input to the whole control system are contemplated.

Estimator of the Angular Position and of the Speed

Figure 23:
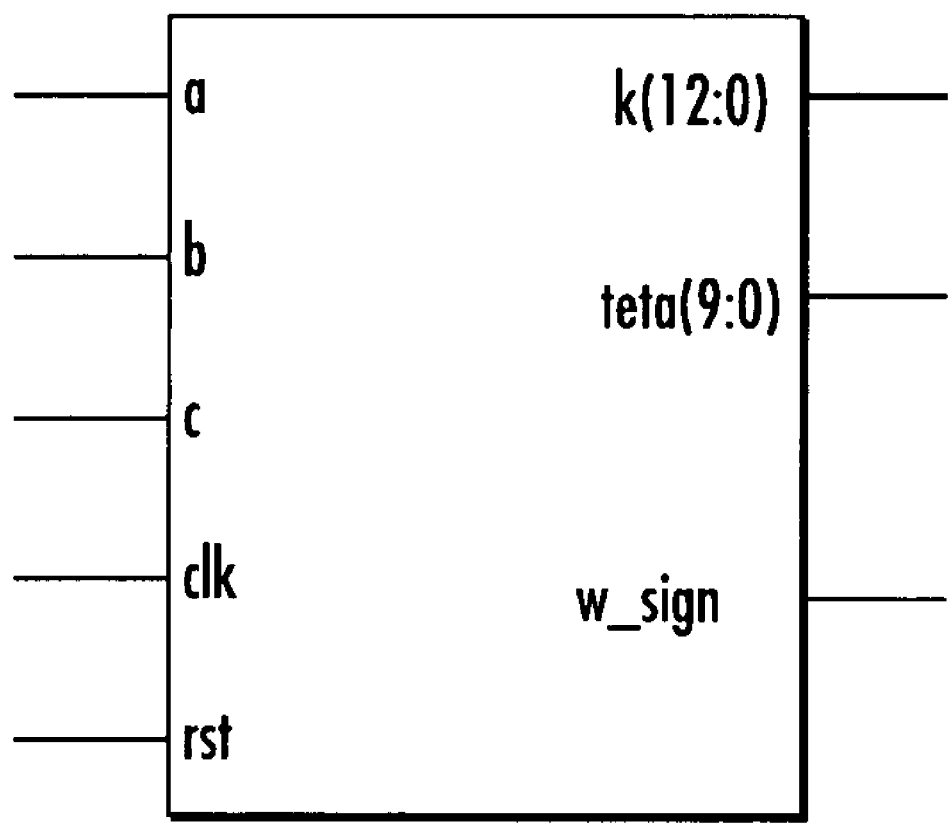
FIG. 23 shows the position and speed estimator of this invention.
Figure 24:
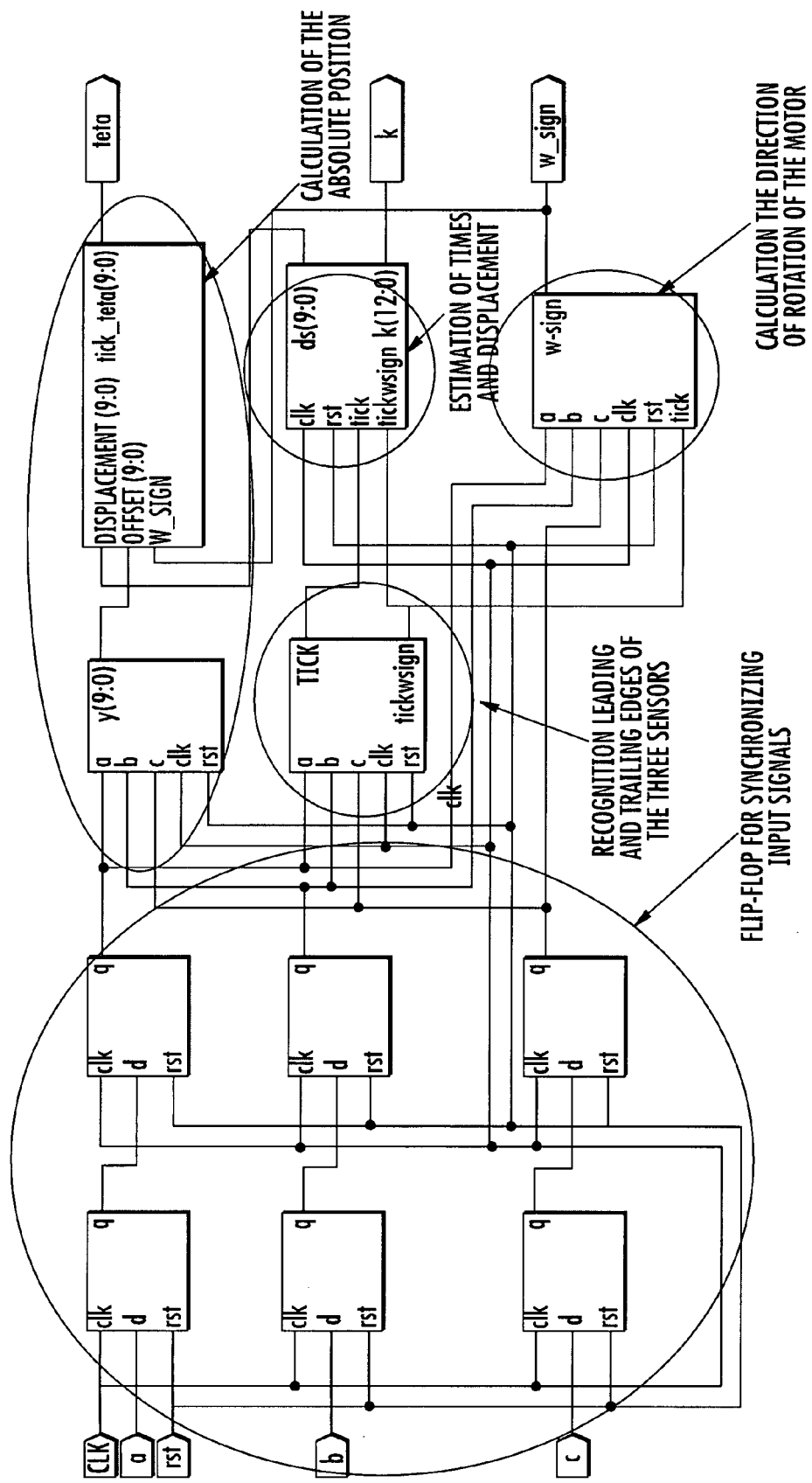
FIG. 24 shows a RTL scheme of the position and speed estimator of this invention.

FIG. 23 shows the block-box of the estimator of the position and of the speed, implemented in VHDL. Through a structural description, the system has been made as compliant as possible to that realized in Simulink™. By examining the block diagram of FIG. 24 it is possible to recognize the various sub-blocks of the estimator.

Figure 25:
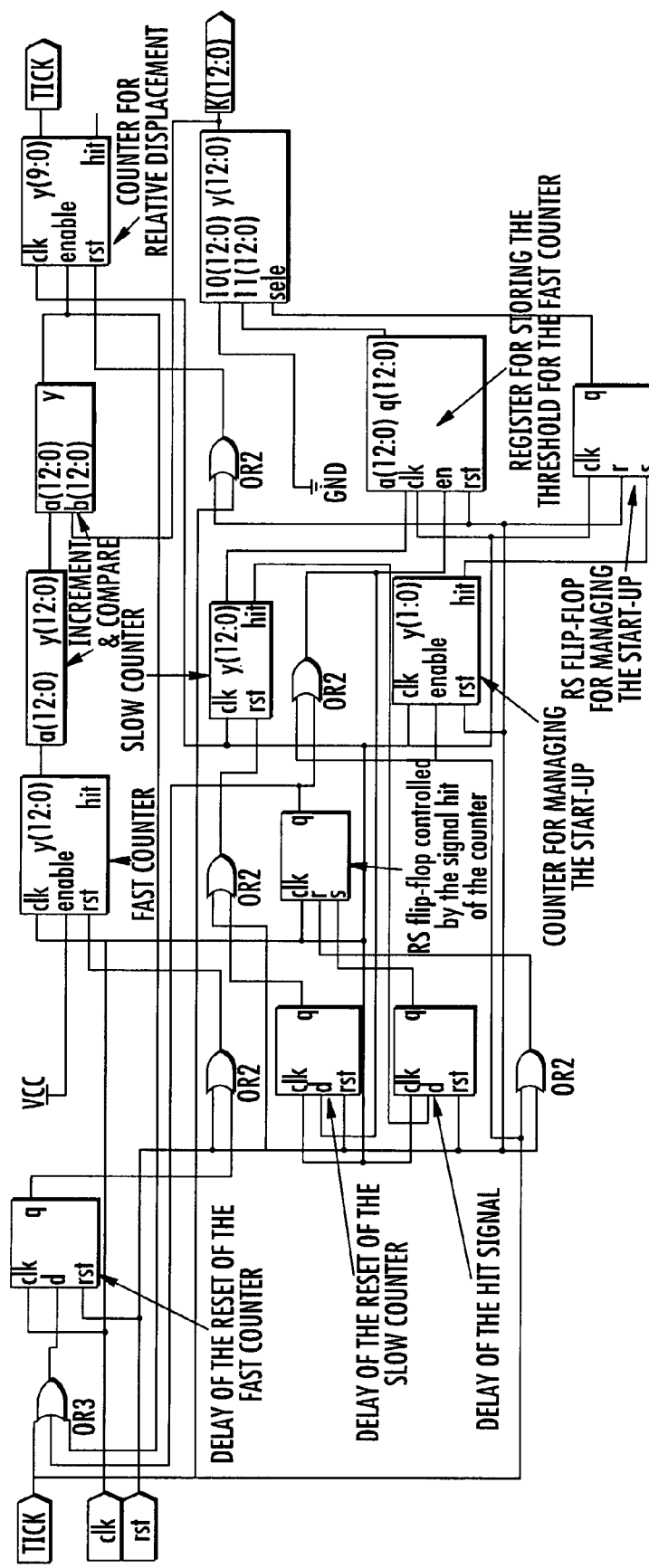
FIG. 25 shows a RTL scheme of the "core" of the estimator of this invention.
Figure 26:
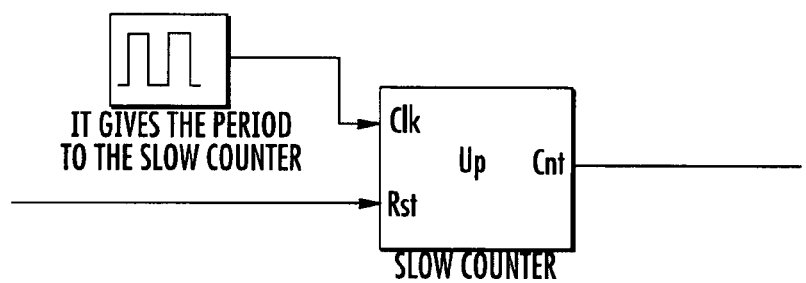
FIG. 26 shows a Simulink™ timing scheme of the slow counter, according to the invention.

It is worth noting how the simulator has contemplated the possibility of realizing the block that, starting from a signals that detects the switchings of the Hall sensors, calculates the time elapsed between two successive switchings and the rotation of the rotor in the instant in which a switching occurs. FIG. 14 depicts the Simulink™ scheme of the block, while FIG. 25 shows a RTL description of the corresponding VHDL implementation.

Figure 27:
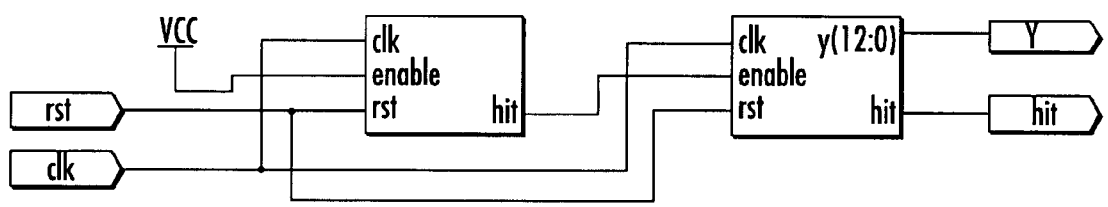
FIG. 27 illustrates a VHSL timing scheme of the slow counter, according to the invention.
Figure 28:
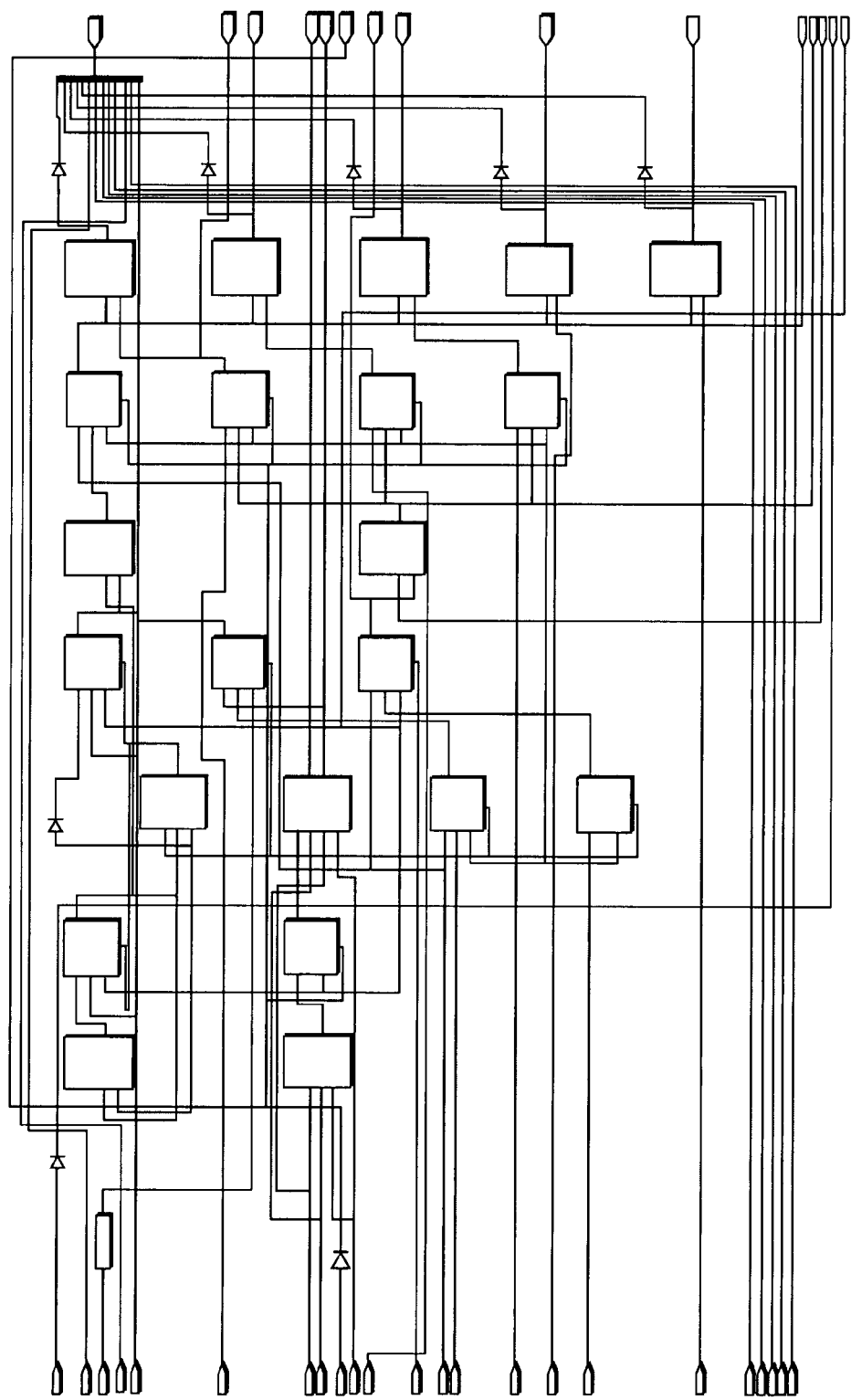
FIG. 28 shows a RTL diagram of the position and speed estimator synthesized without directive Keep Hierarchy, according to the invention.

For sake of example, let us consider the slow counter that has a clock signal with a period 128 times larger than the clock period of the system. Referring to FIGS. 27 and 28, in the Simulink™ realization, a dedicated clock is provided with an appropriate period, while in the VHDL realization two counters in cascade input with the same clock signal are provided. The first counter is always enabled, its end-count value is 128 and when it is reached the signal H$_{IT}$ switches high. This signal enables the second counter and makes it count a pulse every 128 clock pulses.

The RTL depicted in the previous figures have been obtained by imposing as specifications of the simulator the directive "Keep Hierarchy", that is a command that forces the simulator to simulate the structure exactly as it has been defined in the VHDL code. If this directive is not imposed, as stated hereinbefore, the simulator will try to find an optimized realization, eliminating eventual redundant logic gates in the circuit.

This procedure, provided that a good simulator is available, may effectively bring some advantages, nevertheless with this procedure a designer may lose the possibility of debugging the system. A good design technique could be executing, during the first implementing phases, simulations with specifications on the hierarchy. Once the functional verification has been completed, it is possible to start the optimized synthesis. An example of how the whole system of FIG. 24 has been simulated without specifications on the hierarchy is indicated in FIG. 28.

In order to realize the complexity of the system, the following table summarizes the used hardware resources for the synthesis of the system on FPGA and its performances in terms of routing.

TABLE 6

Design Overview

| Property | Value |
| --- | --- |
| Target Device: | xc2s50 |
| Constraints File: | tw.ucf |
| Report Generated: | Friday Jan. 20, 2006 at 10:15 |

Device Utilization Summary

| | Used | Available | Utilization | Note (s) |
| --- | --- | --- | --- | --- |
| Logic Utilization | | | | |
| Number of Slice Flip Flops: | 78 | 1,536 | 5% | |
| Number of 4 input LUTs: | 86 | 1,536 | 5% | |
| Logic Distribution: | | | | |
| Number of occupied Slices: | 93 | 768 | 12% | |
| Number of Slices containing only related logic: | 93 | 93 | 100% | |
| Number of Slices containing unrelated logic: | 0 | 93 | 0% | |
| Total Number 4 input LUTs: | 138 | 1,536 | 8% | |
| Number used as logic: | 86 | | | |
| Number used as a route-thru: | 52 | | | |
| Number of bonded IOBs: | 29 | 92 | 31% | |
| Number of GCLKs: | 1 | 4 | 25% | |
| Number of GCLKIOBs: | 1 | 4 | 25% | |

Performance Summary

| Property | Value |
| --- | --- |
| Final Timing Score: | 0 |
| Number of Unrouted Signals: | All signals are completely routed. |
| Number of Failing Constraints: | 0 |

It has been estimated that the area occupation in terms of equivalent gates is about 1.6 kgates. The results of simulations in VHDL have been saved on a file and the Matlab™ software has been used for comparing the performances of the system realized in Simuling™ with that simulated in VHDL. FIGS. from 29a to 29d show time graphs of the responses of the systems to input speed profiles that simulate particular embodiment of the motor. The results are very satisfactory.

Figure 29:
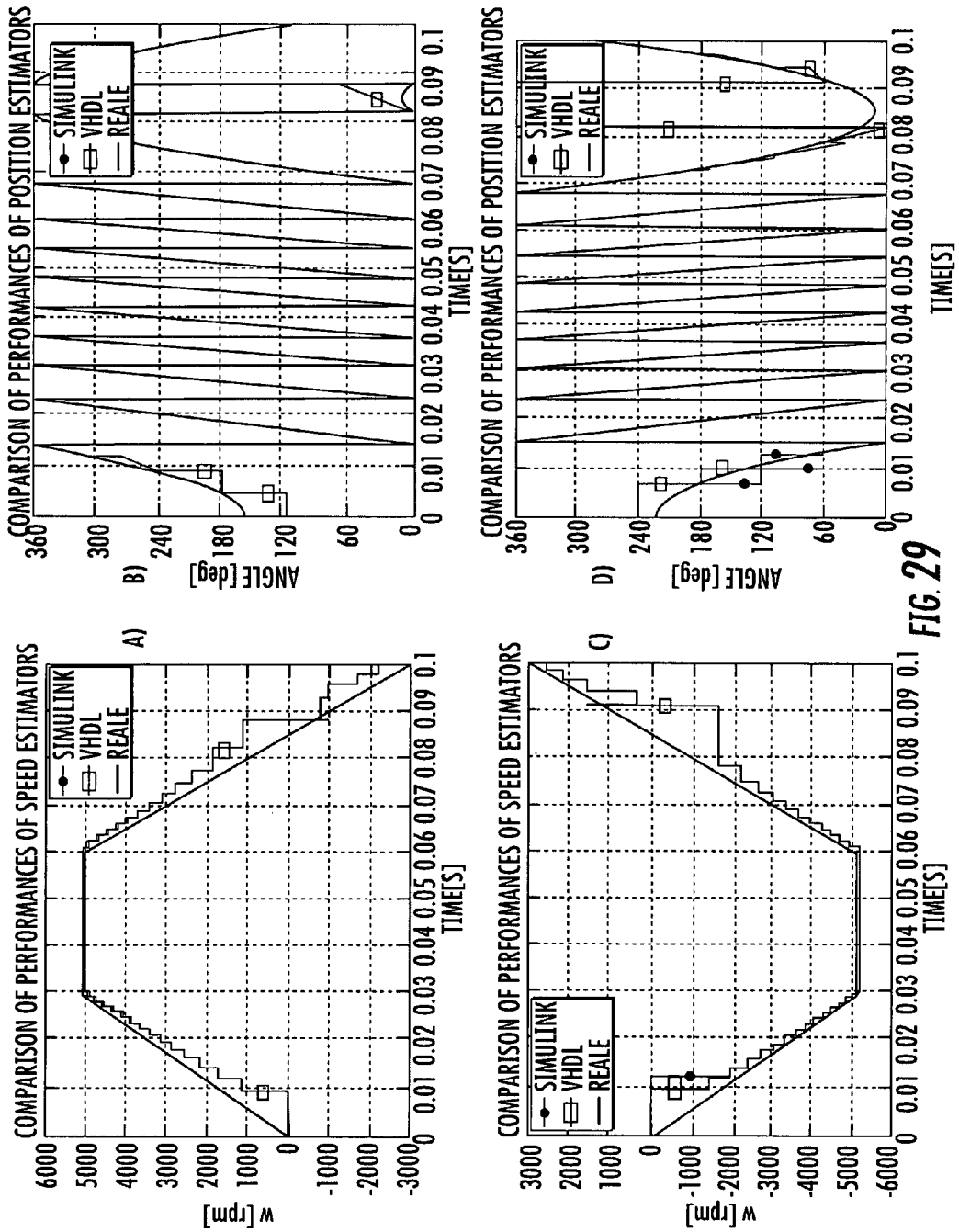

It is worth noting that in FIG. 29, the results provided by the VHDL estimator, before being displayed, have been processed using Matlab™. The outputs of the estimator correspond to the times used by the rotor for rotating by 60 electrical degrees and are not directly associated to speed values. Moreover, the above output values are always positive because they represent times, while the eventual negative sign of the speed has been considered always through the numerical processing during a post-processing phase.

In order to obtain the speeds corresponding to the output times of the estimator, an appropriate conversion law has been applied. Indeed, if the output counting is an integer number x, this means that the rotor has rotated by 60 electrical degrees in a time equal to $$\Delta t1 = x \cdot T_{CLK\text{-}slow}$$

in the hypothesis of having $T_{CLK\text{-}slow} = 128 \cdot 50 \cdot 10^{-9}$ [s], $$\Delta t1 = 6.4 \cdot 10^{-6} \cdot x [s]$$

Given that for rotating by a mechanical revolution it may be necessary to rotate by 12 intervals of 60 electrical degrees, the time that is used for rotating by a mechanical revolution is:

$$\Delta t = 12 \cdot \Delta t1 = 7.68 \cdot 10^{-5} \cdot x [s]$$

A complete revolution corresponds to $2\pi$ radiants, thus the angle of 1 radiant is described in a time equal to $\Delta t/2\pi$ thus, for expressing the speed in radiants per second, $$\omega = \frac{2\pi}{7.68 \cdot 10^{-5} \cdot x} \approx \frac{81771}{x} \text{ rad/s} \qquad (14)$$

Experimental Results

The device has been implemented on FPGA for testing a real system. The estimator has been tested on a brushless motor with 2 polar couples with 3 Hall sensors positioned at 60 degrees. In FIGS. 31 to 34, results of tests carried out at a mechanical rotation speed of 5000 rpm and with both positive and negative directions of rotation. The tests have been carried out using the analyzer of logic states, Tektronix TLA5202 Logic Analyzer.

The results demonstrate that the proposed algorithm works correctly and that its performances in steady conditions are very good and may be optimized further by choosing properly the frequency of the slow and of the fast timers such to be comprised in more stringent design specifications. The transient performances, as shown by the above mentioned tests, are compatible with the common feedback control techniques.

This method and the estimator that implements it may allow to:
1. estimate easily both positive and negative speeds;
2. enhance the precision of the algorithm as one wishes by choosing the working frequencies;
3. estimate the speed of the motor even when it is very small or null; and
4. allow the estimator to be completely digital and may be used as stand-alone peripheral for controlling electrical motors provided with Hall sensors.

That which is claimed is:

1. A method of estimating variation of position of a rotor of a motor having a plurality of spaced sensors that generate a position pulse at every rotation by a pre-established angle of the rotor, the method comprising:
   generating a first clock signal at a first frequency; and
   generating a second clock signal at a second frequency, the second frequency equal to the first frequency multiplied by a first factor;
   estimating variation of position of the rotor, in each interval between two consecutive position pulses, by performing at least the following
      counting a number of pulses of the first clock signal, and
      counting a number of pulses of the second clock signal, wherein each time the number of counted pulses of the second clock signal reaches the number of pulses of the first clock signal counted in an interval that precedes a current interval, signaling that the position of the rotor has rotated by an angle equal to a ratio between the pre-established angle and the first factor.

2. The method of claim 1, wherein the first clock signal is obtained by decimating the second clock signal by a second factor.

3. The method of claim 1, wherein the preceding interval directly precedes the current interval.

4. The method of claim 3, wherein the preceding interval occurs subsequent to a start-up of the motor.

5. The method of claim 1, further comprising estimating an angular speed of the rotor as a ratio between the pre-established angle and a product between the number of pulses of the first clock signal counted in the current interval and a period of the first clock signal.

6. The method of claim 1, wherein the motor comprises a brushless motor, and further comprising:
   installing a plurality of Hall sensors, each generating a respective logic signal that switches each time that a pole of the brushless motor passes over it;
   generating the position pulses at each edge variation of each of the logic signals; and
   establishing a direction of rotation of the rotor by sampling a state of the logic signals in a certain instant and as soon as at least one of the logic signals has switched, and by processing the sampled states.

7. The method of claim 1, further comprising comparing a pre-established threshold with the number of pulses of the first clock signal counted in the current interval, and establishing that the rotor is stationary when the pre-established threshold is exceeded.

8. A method for estimating a position of a rotor of a brushless motor provided with a plurality of Hall sensors, each generating a respective logic signal that switches each time that a pole of the brushless motor passes over it, the method comprising:
   establishing an initial position of the rotor in an initial instant by sampling states assumed by the logic signals in the initial instant and processing the sampled states;
   generating position pulses at each edge variation of each of the logic signals;
   estimating variation of position of the rotor in a successive instant and a direction of rotation of the rotor by performing at least the following
      generating a first clock signal at a first frequency,
      generating a second clock signal at a second frequency, the second frequency equal to the first frequency multiplied by a first factor,
      during a current interval defined by two consecutive position pulses, counting a number of pulses of the first clock signal and a number of pulses of the second clock signal, and
      signaling that the position of the rotor has rotated by an angle equal to a ratio between a pre-established angle and the first factor when the number of pulses of the second clock signal reaches the number of pulses of the first clock signal counted in a preceding interval; and
   estimating the position of the rotor in a successive instant as a function of the initial position of the rotor and the estimated variation of position.

9. The method of claim 8, further comprising estimating an angular speed of the motor as a ratio between the pre-established angle and a product between the number of pulses of the first clock signal counted in the current interval and a period of the first clock signal.

10. The method of claim 8, further comprising establishing a direction of rotation of the rotor by sampling a state of the logic signals in a certain instant and as soon as at least one of the logic signals has switched, and by processing the sampled states.

11. The method of claim 8, further comprising comparing a pre-established threshold with the number of pulses of the first clock signal counted in the current interval, and establishing that the rotor is stationary when the pre-established threshold is exceeded.

12. A device for estimating variation of position of a rotor of a motor comprising:
   a circuit for generating a position pulse at each rotation of the rotor by a pre-established angle, two consecutive position pulses defining a current interval;
   a first timer generating a first counting signal and resetting at each position pulse;
   a register for recording a count value reached by said first timer during a preceding time interval;
   a second timer generating a second counting signal at a speed equal to a speed of said first timer multiplied by a factor, and resetting at each position pulse and each time that the second counting signal reaches the count value stored in said register; and
   a comparator estimating variation of position of the rotor by comparing the second counting signal with the count value stored in said register, and generating pulses that signal that the position of the rotor has rotated by an angle equal to a ratio between the pre-established angle and the factor each time that the count value stored in said register is reached.

13. The device of claim 12, wherein the motor comprises a brushless motor, and wherein said circuit comprises a plurality of Hall sensors, each generating a respective logic signal that switches each time that a pole of the brushless motor passes over it, and wherein the device further comprises
   a second circuit for generating the position pulses at each edge of variation of each of the logic signals;
   a bank of flip-flops for sampling and holding states of the logic signals in a initial instant and as soon as at least one of the logic signal switches; and
   a logic network generating a signal that represents a direction of rotation of the brushless motor by processing the sampled states.

14. The device of claim 13, further comprising:
   a second logic network generating a signal that represents a position of the rotor in the initial instant by processing a state assumed by the logic signals in the initial instant; and
   an adder input with the signal that represents the position of the rotor at the initial instant, the signal that represents the direction of rotation of the brushless motor, and the pulses generated by said comparator, said adder generating a signal that represents a position of the rotor in an instant successive to the initial instant.

15. A device for estimating variation of position of a rotor of a brushless motor comprising:
   a plurality Hall sensors, each generating a respective logic signal that switches each time that a pole of the brushless motor passes over it;
   a circuit for generating position pulses at each edge of variation of each of the logic signals, two consecutive position pulses defining a current interval;
   a first timer generating a first clock signal at a first frequency and resetting at each position pulse;
   a register recording a count value reached by said first timer during a preceding interval;
   a second timer generating a second clock signal at a second frequency equal to the first frequency multiplied by a factor and resetting at each position pulse and when the second clock signal reaches the count value; and a comparator estimating variation of position of the rotor by generating a pulse signaling, when the second clock signal reaches a count equal to the count value, the position of the rotor has rotated by an angle equal to a ratio between the pre-established angle and the factor.

16. The device of claim 15, the device further comprising:

a bank of flip-flops for sampling and holding the state of the logic signals in a initial instant and as soon as at least one of the logic signal switches; and a logic network generating a signal that represents a direction of rotation of the brushless motor by logically processing the sampled states.

17. The device of claim 16, further comprising:

a second logic network generating a signal that represents a position of the rotor in the initial instant by processing logically a state assumed by the logic signals in the instant; and an adder input with the signal that represents the position of the rotor in an initial instant, the signal that represents the direction of rotation of the brushless motor, and the pulses generated by said comparator, said adder generating a signal that represents a position of the rotor in an instant successive to the initial instant.

* * * * *

UNITED STATES PATENT AND TRADEMARK OFFICE
CERTIFICATE OF CORRECTION

PATENT NO. : 7,714,571 B2
APPLICATION NO. : 11/689736
DATED : May 11, 2010
INVENTOR(S) : Pirozzi et al.

Page 1 of 2

It is certified that error appears in the above-identified patent and that said Letters Patent is hereby corrected as shown below:

| | |
|---|---|
| Column 2, Line 63 | Delete: "Packag" <br> Insert: --Package-- |
| Column 4, Line 31 | Delete: "filed" <br> Insert: --field-- |
| Column 7, Line 4 | Delete: "be" <br> Insert: --is-- |
| Column 9, Line 43 | Delete: "recognize" <br> Insert: --recognizes-- |
| Column 9, Line 65 | Delete: "corresponds" <br> Insert: --correspond-- |
| Column 13, Line 6 | Delete: "s" <br> Insert: --is-- |
| Column 13, Line 32 | Delete: "in" <br> Insert: --In-- |
| Column 15, Line 5 | Delete: " $\Delta t_{MAX} = (2^{13} - 1) \cdot T_{CLK-slow} == 0.05s$ " <br> Insert: -- $\Delta t_{MAX} = (2^{13} - 1) \cdot T_{CLK-slow} = 0.05s$ -- |
| Column 15, Line 25 | Delete: " $T_{STOP} = (2^{13} - 1) \cdot T_{CLK-slow} \approx 0.05s$ " <br> Insert: -- $T_{STOP} = (2^{13} - 1) \cdot T_{CLK-slow} \approx 0.05s$ -- |

Signed and Sealed this

Fifth Day of October, 2010

David J. Kappos
*Director of the United States Patent and Trademark Office*

CERTIFICATE OF CORRECTION (continued)
U.S. Pat. No. 7,714,571 B2

| | |
|---|---|
| Column 16, Line 2 | Delete: "sign be"<br>Insert: --sign will be-- |
| Column 16, Line 36 | Delete: "signals"<br>Insert: --signal-- |
| Column 20, Line 55, Claim 15 | Delete: "plurality Hall"<br>Insert: --plurality of Hall-- |

UNITED STATES PATENT AND TRADEMARK OFFICE
CERTIFICATE OF CORRECTION

PATENT NO. : 7,714,571 B2  Page 1 of 2
APPLICATION NO. : 11/689736
DATED : May 11, 2010
INVENTOR(S) : Pirozzi et al.

It is certified that error appears in the above-identified patent and that said Letters Patent is hereby corrected as shown below:

| | |
|---|---|
| Column 2, Line 63 | Delete: "Packag"<br>Insert: --Package-- |
| Column 4, Line 31 | Delete: "filed"<br>Insert: --field-- |
| Column 7, Line 4 | Delete: "be"<br>Insert: --is-- |
| Column 9, Line 43 | Delete: "recognize"<br>Insert: --recognizes-- |
| Column 9, Line 65 | Delete: "corresponds"<br>Insert: --correspond-- |
| Column 13, Line 6 | Delete: "s"<br>Insert: --is-- |
| Column 13, Line 32 | Delete: "in"<br>Insert: --In-- |
| Column 15, Line 5 | Delete: "$\Delta t_{MAX} = (2^{13} - 1) \cdot T_{CLK-slow} == 0.05s$"<br>Insert: --$\Delta t_{MAX} = (2^{13} - 1) \cdot T_{CLK-slow} = 0.05s$-- |
| Column 15, Line 25 | Delete: "$T_{STOP} = (2^{13} - 1) \cdot T_{CLK-slow} \approx 0.5s$"<br>Insert: --$T_{STOP} = (2^{13} - 1) \cdot T_{CLK-slow} \approx 0.5s$-- |
| Column 16, Line 2 | Delete: "sign be"<br>Insert: --sign will be-- |
| Column 16, Line 36 | Delete: "signals"<br>Insert: --signal-- |

Signed and Sealed this

Nineteenth Day of October, 2010

David J. Kappos
*Director of the United States Patent and Trademark Office*

CERTIFICATE OF CORRECTION (continued)
U.S. Pat. No. 7,714,571 B2

Column 20, Line 55     Delete: "plurality Hall"
Claim 15                Insert: --plurality of Hall--